United States Patent
Dey et al.

(10) Patent No.: US 10,715,448 B2
(45) Date of Patent: Jul. 14, 2020

(54) SYSTEM AND/OR METHOD FOR PREDICTIVE RESOURCE MANAGEMENT IN FILE TRANSFER SERVERS

(71) Applicant: Software AG, Darmstadt (DE)

(72) Inventors: Subhashish Dey, Burdwan (IN); Sanju Krishnan Retnakumari, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 64 days.

(21) Appl. No.: 15/990,048

(22) Filed: May 25, 2018

(65) Prior Publication Data

US 2019/0363988 A1 Nov. 28, 2019

(51) Int. Cl.
*H04L 12/803* (2013.01)
*H04L 29/08* (2006.01)
*H04L 12/911* (2013.01)
*G06N 20/00* (2019.01)

(52) U.S. Cl.
CPC ........... *H04L 47/125* (2013.01); *G06N 20/00* (2019.01); *H04L 47/822* (2013.01); *H04L 47/823* (2013.01); *H04L 67/06* (2013.01); *H04L 67/1027* (2013.01)

(58) Field of Classification Search
CPC ............................. H04L 47/10; H04L 47/125
See application file for complete search history.

(56) References Cited

U.S. PATENT DOCUMENTS

| | | | |
|---|---|---|---|
| 5,289,462 A | 2/1994 | Ahmadi et al. | |
| 5,359,593 A | 10/1994 | Derby et al. | |
| 5,367,523 A | 11/1994 | Chang et al. | |
| 6,829,637 B2 | 12/2004 | Kokku et al. | |
| 7,185,096 B2 | 2/2007 | Kalyanavarathan et al. | |
| 9,407,944 B1* | 8/2016 | Galdy | H04N 21/2385 |
| 2005/0149540 A1 | 7/2005 | Chan et al. | |
| 2014/0310390 A1* | 10/2014 | Sorenson, III | H04L 47/10 709/223 |
| 2015/0006710 A1* | 1/2015 | Sauerwald | H04L 67/125 709/224 |

(Continued)

FOREIGN PATENT DOCUMENTS

| | | |
|---|---|---|
| JP | 2004-206595 | 7/2004 |
| JP | 5227275 | 3/2013 |
| WO | 2014/187504 | 11/2014 |

*Primary Examiner* — Andrew C Georgandellis
(74) *Attorney, Agent, or Firm* — Nixon & Vanderhye P.C.

(57) ABSTRACT

Certain example embodiments relate to techniques for addressing resource utilization issues in network components (e.g., file transfer servers running out of memory, for example) by identifying and predicting scenarios that are likely to cause problems, and handling them gracefully, without having to deny service completely. Based on current runtime status information and a prediction of how a given request will impact the server and/or the network, a determination is made regarding whether that request is to be accepted by the server. If the total resource usage of the server exceeds or is likely to exceed a threshold: the speed at which requests being processed are being handled is controlled, such that (a) speeds of all but some of the requests are throttled, (b) throttled requests are neither terminated nor allowed to timeout, (c) as non-throttled requests are completed, requests that are throttled have their speeds increased in a predetermined manner.

18 Claims, 14 Drawing Sheets

(56) References Cited

U.S. PATENT DOCUMENTS

2015/0026793 A1 1/2015 Li et al.
2016/0094611 A1* 3/2016 Chow .................... H04L 67/02
709/203

* cited by examiner

SYSTEM AND/OR METHOD FOR PREDICTIVE RESOURCE MANAGEMENT IN FILE TRANSFER SERVERS

TECHNICAL FIELD

Certain example embodiments described herein relate to techniques for managing congestion in networks and/or resource utilization in network components. More particularly, certain example embodiments described herein relate to systems and/or methods that address congestion and/or resource utilization issues in network components (e.g., such as servers, generally including file transfer servers, running out of memory, for example) by identifying and predicting scenarios that are likely to cause congestion-related problems, and handling them gracefully, without necessarily having to deny service completely.

BACKGROUND AND SUMMARY

As the world becomes more and more computer dependent and more and more interconnected through computer networks, the need to keep such computer networks up and running increases concomitantly. Congestion in network components can become quite problematic in a variety of scenarios, e.g., where such networks are relied upon for enabling communications, transferring files, coordinating the activities of organizations, etc. There are a number of scenarios such as, for example, virus scanning, checksum calculation, etc., where a server may need to keep incoming data in its runtime memory for pre-processing. Although these activities are typically legitimate functions and oftentimes are required (e.g., to meet service level agreements, ensure the safety of transmissions, etc.), they unfortunately can lead to the server running out of memory, thereby disrupting other applications in the server. These issues are likely to occur when there are large numbers of incoming requests, when requests involve large data files, and/or the like.

There are several solutions available for addressing these concerns. One solution involves denial of service based on a threshold of available memory being surpassed. In this solution, any new incoming request is denied service once the threshold is reached, thereby protecting the total consumed memory from exceeding a predefined limit. Although this solution is effective in some circumstances, it actually can lead to problems in others. For example, multiple requests may be given access at the same or substantially the same time and when the server initially seemingly has sufficient memory to handle them, but these otherwise-allowed requests may gradually consume the server's memory, causing it to run out of memory.

FIG. 1 demonstrates how this denial of service approach to handling congestion can become problematic. The system involved in FIG. 1 is assumed to have a total server working memory of 1,024 MB and a denial of service limit set at 250 MB. Thus, when memory utilization reaches one-quarter of the total working memory, additional requests are denied. Referring to FIG. 1, initially, none of the working memory is used. Three requests are received by the server at the same of substantially the same time, and all are approved for processing, as memory utilization is low. As these requests are being processed, they gradually surpass the memory threshold. At this point, new incoming requests are denied. Yet the requests already being processed continue along and, gradually, they consume the available working memory. At some point, they cause a system crash because the usable system memory is completely consumed.

Another solution for addressing system resource utilization problems involves clustering of servers and/or memory. In this solution, the server can be scaled across different nodes (e.g., in a clustering-type approach), thereby distributing the load across systems. Here, as soon as the load on a server (calculated on the basis of number of requests/memory, for example), is identified to be high, no more new requests are directed to the server. This process helps balance the load, but a given loaded server instance nonetheless may become overloaded (e.g., as a result of an error in load balancing, as a result of a problem such as the one described above, etc.), thereby resulting in the failure of the processing requests. This approach also sometimes is limited in the sense that the state of the file transfer cannot be resumed in the event of a failure and instead needs to be restarted. This approach also requires separate nodes and/or installations to scale, which may not be feasible given monetary constraints and which may be inconvenient in terms of setup and maintenance, for example.

Another solution involves denial of service based on the size of file involved in the transfer (e.g., uploaded to the server). For example, any incoming request is denied if it is associated with a file to be uploaded that has a size larger than a predetermined maximum. One apparent drawback is that there is a limitation regarding size. In one implementation of this solution, whenever there is a connection request, the server assigns a slot of memory (a post box area) based on the memory required by the request from the total available memory to the request. The server gives a denial of service for all other subsequent requests if there are no slots available in the server's main memory. One disadvantage of this implementation, however, includes being unable to address dynamic file uploads as the file sizes of files are not always known at the time of initiation of file transfer. Another disadvantage with this implementation relates to its susceptibility to security threats. For instance, a malicious program could reserve the entire server memory by being deceptive about its size, thereby holding onto the session and obstructing other requests.

Still another solution involves adaptive transfer, where the transfer from the client is adapted based on the network and/or memory load, e.g., using protocols known to the client. One disadvantage to this approach however, is that it typically uses control-level packets to control the transfer from the client, which an external client may not be aware of, leading to a sort of coordination problem and potentially making the approach unworkable.

It will be appreciated that it would be desirable to overcome the above-identified and/or other problems. For example, it will be appreciated that it would be desirable to avert congestion issues at servers (e.g., file transfer servers) such that requests for services (e.g., file transfer services such as, for example, upload and download operations) are able to take place and do not cause a system crash.

One aspect of certain example embodiments relates to overcoming the above-described and/or other issues. For example, one aspect of certain example embodiments relates to techniques for identifying and predicting congestion-related scenarios before they take place, and taking action so that the crashes can be averted, without having to deny service altogether.

Another aspect of certain example embodiments relates to the use of programmed artificial intelligence to understand when congestion-related scenarios are likely to take place. For instance, certain example embodiments may learn strategies based on client identification and understanding client's behavioral patterns, in order to predict congestion in the system.

Another aspect of certain example embodiments relates to learning transfer statistics and creating environment-specific data models that store snapshots of client and/or system behavior(s), using these data models to predict a machine's status, and intelligently handling the clients in a systematic way so as to avert crashes, rather than merely addressing congestion by controlling bandwidth or throttling.

In certain example embodiments, a computer network is provided. The network includes a load balancer and one or more monitors. A cluster comprises a plurality of servers, with each said server including at least one processor, a memory, and a transceiver. The servers are configured to receive, from at least one client computing device remote therefrom and via the load balancer, a plurality of requests to be processed. A plurality of speed limiter modules is included, with each said speed limiter module being associated with a respective one of the servers. The speed limiter modules are configured to at least: receive, from the one or more monitors, current runtime status information pertaining to the computer network and the server associated therewith; predict how a given request will impact the server associated therewith and/or the computer network; determine, based on the received current runtime status information and the prediction, whether an incoming request is to be accepted by the server associated therewith; responsive to a determination that an incoming request is to be accepted, initiate processing of the incoming request via the server associated therewith; determine whether the total resource usage of the server associated therewith exceeds or is likely to exceed an initial resource threshold; and responsive to a determination that the total resource usage of the server associated therewith exceeds or is likely to exceed the initial resource threshold cease acceptance of further incoming requests, and control the speed at which requests currently being processed by the server associated therewith are being handled, such that (a) speeds of all but at least one of the requests currently being processed are throttled, (b) requests that are being throttled are neither terminated nor allowed to timeout nor handed over to another server in the cluster, (c) non-throttled requests are permitted to proceed to completion, and (d) as non-throttled requests are completed, requests that are throttled have their speeds increased in a predetermined manner.

According to certain example embodiments, the requests may be file transfer requests.

According to certain example embodiments, the initial resource threshold may pertain to memory utilization.

According to certain example embodiments, predictions may be made in accordance with a plurality of machine-learned models, e.g., with the the machine-learned models potentially including a first model related to peak operation times, and a second model related to aspects of incoming requests.

According to certain example embodiments, the amount of throttling may be based on current network status and output from the machine-learned models.

In certain example embodiments, a computer network is provided. The computer network comprises one or more monitors. A file transfer server includes at least one processor, a memory, and a transceiver. The file transfer server is configured to receive, via the transceiver and from at least one client computing device remote therefrom, a plurality of file transfer related requests to be processed by the file transfer server. A speed limiter module is configured to at least: receive, from the one or more monitors, current runtime status information pertaining to the computer network and the file transfer server; predict how a given request will impact the file transfer server and/or the computer network; determine, based on the received current runtime status information and the prediction, whether an incoming request is to be accepted by the file transfer server; responsive to a determination that an incoming request is to be accepted, initiate processing of the incoming request via the file transfer server; determine whether the total resource usage of the file transfer server exceeds or is likely to exceed an initial resource threshold; and responsive to a determination that the total resource usage of the file transfer server exceeds or is likely to exceed the initial resource threshold cease acceptance of further incoming requests, and control the speed at which requests currently being processed by the file transfer server are being handled, such that (a) speeds of all but at least one of the requests currently being processed are throttled, (b) requests that are being throttled are neither terminated nor allowed to timeout, (c) non-throttled requests are permitted to proceed to completion, and (d) as non-throttled requests are completed, requests that are throttled have their speeds increased in a predetermined manner.

In certain example embodiments a file transfer server in a computer network is provided. The file transfer server includes at least one processor; a memory; and a transceiver. The transceiver is configured to receive, from at least one client computing device, a plurality of file transfer related requests to be processed by the file transfer server. A speed limiter module is configured to at least: receive, from one or more monitors, current runtime status information pertaining to the computer network and the file transfer server; predict how a given request will impact the file transfer server and/or the computer network; determine, based on the received current runtime status information and the prediction, whether an incoming request is to be accepted by the file transfer server; responsive to a determination that an incoming request is to be accepted, initiate processing of the incoming request via the file transfer server; determine whether the total resource usage of the file transfer server exceeds or is likely to exceed an initial resource threshold; and responsive to a determination that the total resource usage of the file transfer server exceeds or is likely to exceed the initial resource threshold cease acceptance of further incoming requests, and control the speed at which requests currently being processed by the file transfer server are being handled, such that (a) speeds of all but at least one of the requests currently being processed are throttled, (b) requests that are being throttled are neither terminated nor allowed to timeout, (c) non-throttled requests are permitted to proceed to completion, and (d) as non-throttled requests are completed, requests that are throttled have their speeds increased in a predetermined manner.

In addition to the features of the previous paragraphs, counterpart methods, non-transitory computer readable storage media tangibly storing instructions for performing such methods, executable computer programs, and the like, are contemplated herein, as well.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments described herein relate to systems and/or methods that address congestion and/or resource utilization issues in network components (e.g., such as servers generally including file transfer servers running out of memory, for example) by identifying and predicting scenarios that are likely to cause congestion-related problems, and handling them gracefully, without necessarily having to deny service completely. In this regard, certain example embodiments aim to allow for, and/or assist in, the recovery of dying nodes, caused because of high-load and/or other scenarios. For instance, in the file transfer context, instead of failing current transfers and handing over new transfers to other nodes, the approach of certain example embodiments aims at recovering the current transfers and also the current node, thereby minimizing the impact of such failure scenarios. When multiple requests are served concurrently, at high rate based on their network bandwidth and/or processing power, etc., there might be scenarios where all of a server's memory is used up, resulting in a crash of that server (or server instance). Identifying such scenarios beforehand with programmed artificial intelligence and focusing on controlled processing of requests, depending on network, memory, processing bandwidth, and/or the like, can in certain example instances advantageously help to predict crashes that might occur in the system before they come to pass and advantageously allow for them to be averted.

Figure 2:
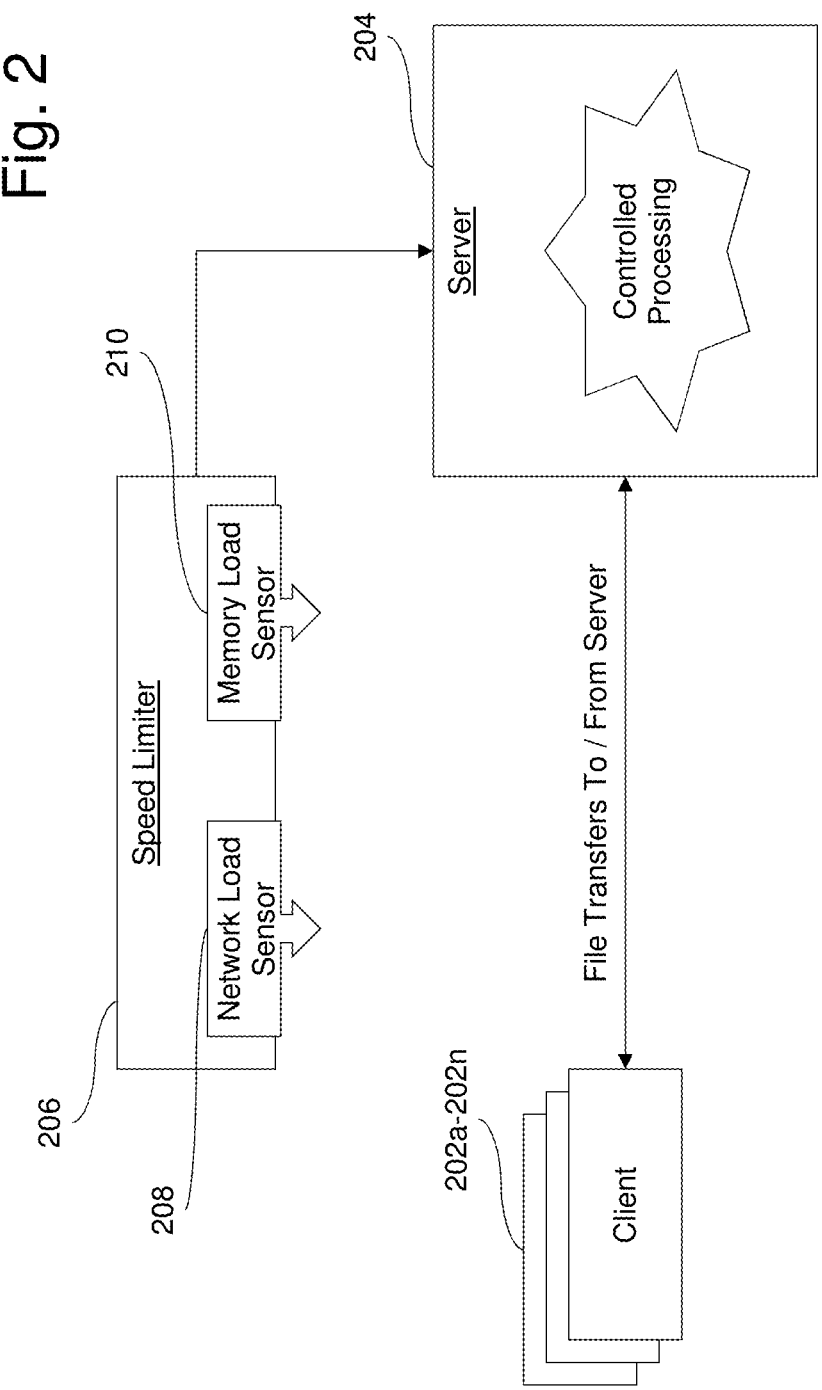
FIG. 2 is a block diagram showing components of an example embodiment including a plurality of clients and a single server.

FIG. 2 is a block diagram showing components of an example embodiment including a plurality of clients and a single server. In the FIG. 2 example, clients 202a-202n are involved in transferring files to and/or from the server 204. The clients 202a-202n may be any suitable computing devices such as, for example, desktop or laptop computers, smart devices, and/or other terminals that, in general, include processing resources including hardware processors and memories. Similarly, the server 204 includes processing resources including at least one hardware processor and a memory. The clients 202a-202n may communicate with the server 204 over any suitable electronic connection such as, for example, a wired connection, a wireless connection implementing 802.11 or the like, Bluetooth, etc.

A speed limiter 206 includes or is otherwise in operable communication with a plurality of sensors that monitor the health of the server 204. For instance, in the FIG. 2 example, the speed limiter 206 includes a network load sensor 208 and a memory load sensor 210. These and/or other sensors may be provided in different example embodiments. For instance, sensors may be provided to monitor available processing power, CPU utilization, number of active threads, number of active requests, etc. The speed limiter 206 applies artificial intelligence to examine output from the sensors to predict when problems might occur. Based on the output from the speed limiter 206, the server 204 may engage in a more managed or controlled processing of requests, e.g., so as to help avert the anticipated problems. The speed limiter 206 may be implemented as a software module in certain example embodiments. In certain example embodiments, the speed limiter 206 may be integrated into the server 204 (and, for example, executed as software by hardware processing resources of the server). In other example embodiments, the speed limiter 206 may be separate from but in communication with the server 204.

Figure 3:
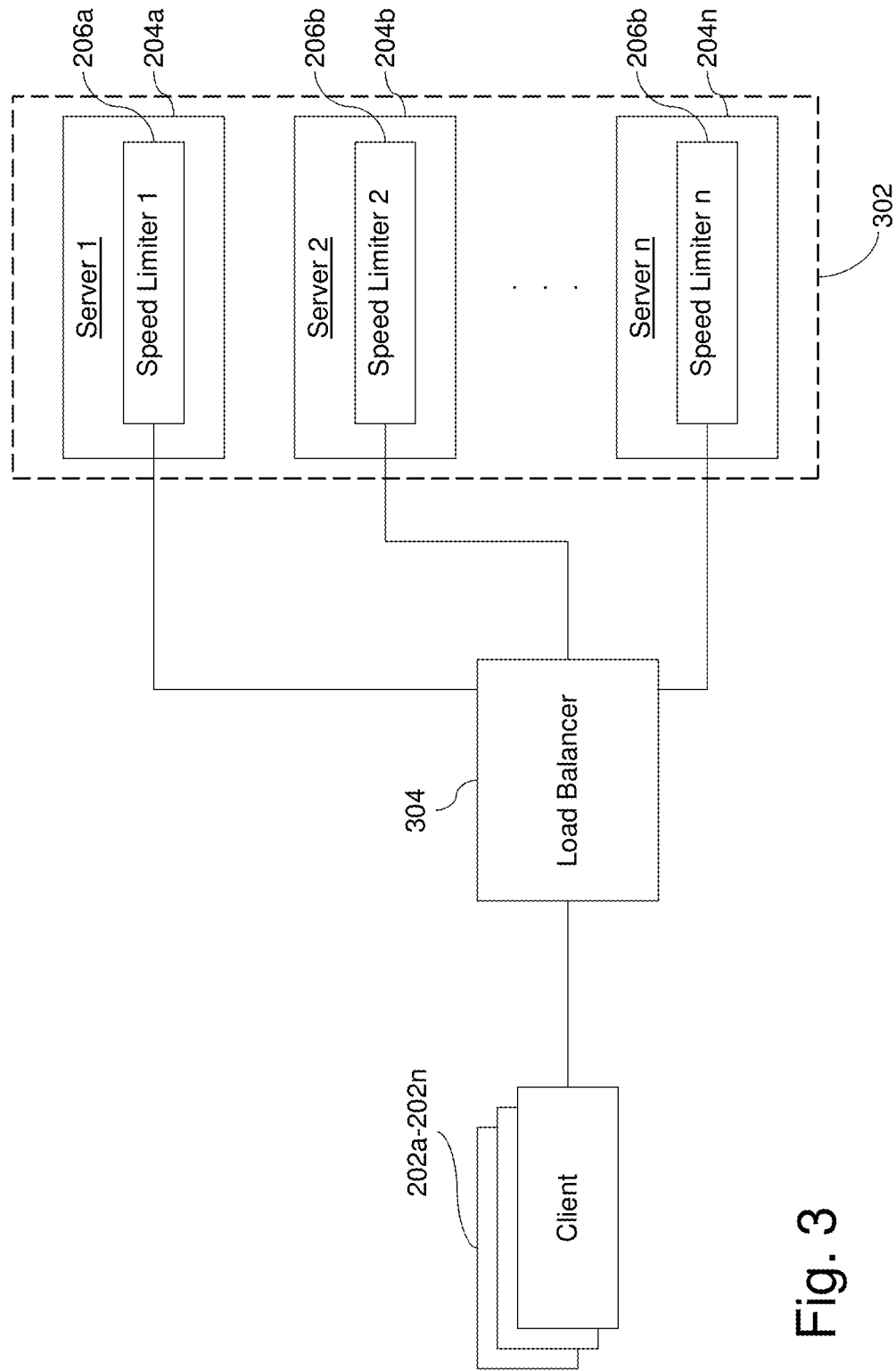
FIG. 3 is a block diagram in which multiple servers are provided in a server cluster, in connection with certain example embodiments.

Although the description above has been described in connection with a single server 204 and multiple clients 202a-202n, it will be appreciated that other network configurations may be implemented in different embodiments. In this regard, FIG. 3 is a block diagram in which multiple servers or server instances 204a-204n are provided in a server cluster 302, in connection with certain example embodiments. The servers 204a-204n in FIG. 3 include respective speed limiter instances 206a-206n. To help enable efficient clustering, the speed limiter instances 206a-206n provide an optional load balancer 304 with an extra edge over merely assigning request to various server instances 204a-204n, as would be conventional. That is, current load balancers typically distribute requests based on load distribution algorithms (e.g., round robin, etc.). By contrast, certain example embodiments enable the load balancer 304 to optionally use such algorithms, but to also check the current runtime status of the server instances 204a-204n in the cluster 306 and assign requests to particular server instances based on the availability and/or health of the server instances 204a-204n, overall. That is, current runtime status can be checked first in certain example embodiments, and then a more conventional distribution algorithm can be applied. In certain example embodiments, the gateway load balancer 304 checks the health of each server instance before assigning a request. In this way, certain example embodiments may narrow the pool of servers or server instances to which requests can be distributed, in essence applying the conventional algorithm to a partial subset of the server instances in the overall cluster. It will be appreciated that the current runtime status is different is different from the expected or predicted growth in resource utilization following the acceptance of a request. In that regard, it will be appreciated that the speed limiter instances 206a-206n in certain example embodiments may help the load balancer 304 not only check the current health of the server instances 204a-204n, but also determine a predicted health, which goes a step further in avoiding congestions. The speed limiter instances 206a-206n help ensure that all accepted requests are completely served (e.g., without memory and/or latency issues).

FIG. 3 shows a load balancer being decoupled from the speed limiters. In this regard, certain example embodiments implement speed limiters as very loosely-coupled components that sit on top of a server, helping in intelligently predicting memory- and/or other resource-critical scenarios of that server. However, a speed limiter may be incorporated into a load balancer in certain example embodiments, and one or more speed limiters may be separate hardware and/or software components in other example embodiments.

The following table helps demonstrate the impact of speed limiter implementation on normal and clustered environments such as in those shown in FIGS. 2 and 3, respectively.

the corresponding node for processing; otherwise, the request is in essence rejected at the beginning, preserving its processing power for other transfers. It will be appreciated that, in certain example embodiments, because the speed limiter(s) help(s) ensure that connections that it can serve completely are accepted, failure rates are lower than compared to conventional arrangements.

As will become clearer from the description that follows, the speed limiter of certain example embodiments can use memory, network, process usage, and/or other component and/or system metrics to dynamically control the speed of running transfers. In so doing, it becomes possible in certain example instances to predict whether a node is dying and to take steps to recover it. In this regard, certain example embodiments are able to develop policies, using machine learning based on previous traffic, to handle requests in the future with a greater likelihood of such requests being successfully handled and without needing to trigger failover operations. Advantageously, in clustered environments where a load balancer is implemented, the speed limiter of certain example embodiments also able to help the load balancer in knowing the actual runtime usage, e.g., for better resource distribution or clustering.

Example Implementation

Details concerning an example implementation are provided below. It will be appreciated that this example imple-

|  | Single Server | Single Server with Speed Limiter | Load Balancer in front of Cluster | Load Balancer in front of Cluster with Speed Limiter |
| --- | --- | --- | --- | --- |
| Processing Power | Normal | Normal | Normal x # Nodes in Cluster | Normal x # Nodes in Cluster |
| Acceptance Criteria for a New Request | Free memory is greater than a threshold or allowed value, | Predicted memory usage by the client, if the request is accepted, is within limits, | Scheduling to a node depends on predefined load balancing algorithms A request is assigned to a node, and only when the assigned node fails to process a request is the request forwarded to another server to be reprocessed. | Load balancer gets the predicted health from the speed limiter component of the node. Once the speed limiter accepts a connection, it ensures the request is fulfilled without failure. |
| Failure Scenarios | Accepting a request based on current memory usage may lead a runtime to run out of memory at later stages. | Connections are accepted based on predicted memory usage. Regular health monitors help prevent out of memory and/or other type crashes. | Even though a failed transaction will be handled by another node, resources and time are wasted | The speed limiter accepts a transfer request only when it predicts that its corresponding node has sufficient resources to handle the request, so failure rates are negligible. |

In certain example embodiments, the load balancer is guided by the speed limiter component of the respective node to receive an assurance that the request can be processed. Once it receives this assurance, the request is sent to mentation is provided to help demonstrate concepts of certain example embodiments, and aspects thereof are non-limiting in nature unless specifically claimed. For example, descriptions concerning example classes, functions, schemas, component configurations, metrics, model components, etc., are non-limiting in nature unless specifically claimed.

As will be appreciated from the detailed description below, the speed limiter of certain example embodiments aids in monitoring the network, memory, processor utilization, bandwidth available, and/or other metrics and, based on the health of components and/or the overall system, facilitates the processing of network requests (e.g., file transfer requests) at the server side. If the resources available in the server are less than a threshold, the speed limiter in certain example embodiments aims to serve requests one-by-one (in some instances), instead of processing them all concurrently. In certain example embodiments, it throttles some of the requests and processes them in a selective (e.g., random manner, first-in-first-out, first-in-last-out, largest-to-smallest, smallest-to-largest, and/or other other), thereby enabling all requests to be completed gracefully. The speed limiter can learn transfer statistics associated with the client request and reuse them intelligently to control the processing of requests, thereby helping to avert congestion in the network. Such transfer statistics may be present in the request (or headers associated with the request), and such statistics may be collected over the whole period of transfer (e.g., until the transfer is complete), for instance, in the case of tracking average speed, average CPU usage associated with the request, number of requests started concurrently by the individual clients, etc. Other statistics may be inferred from other operational parameters (e.g., a request originated from a smart device likely has lower bandwidth than a request from a laptop, etc.).

Figure 4:
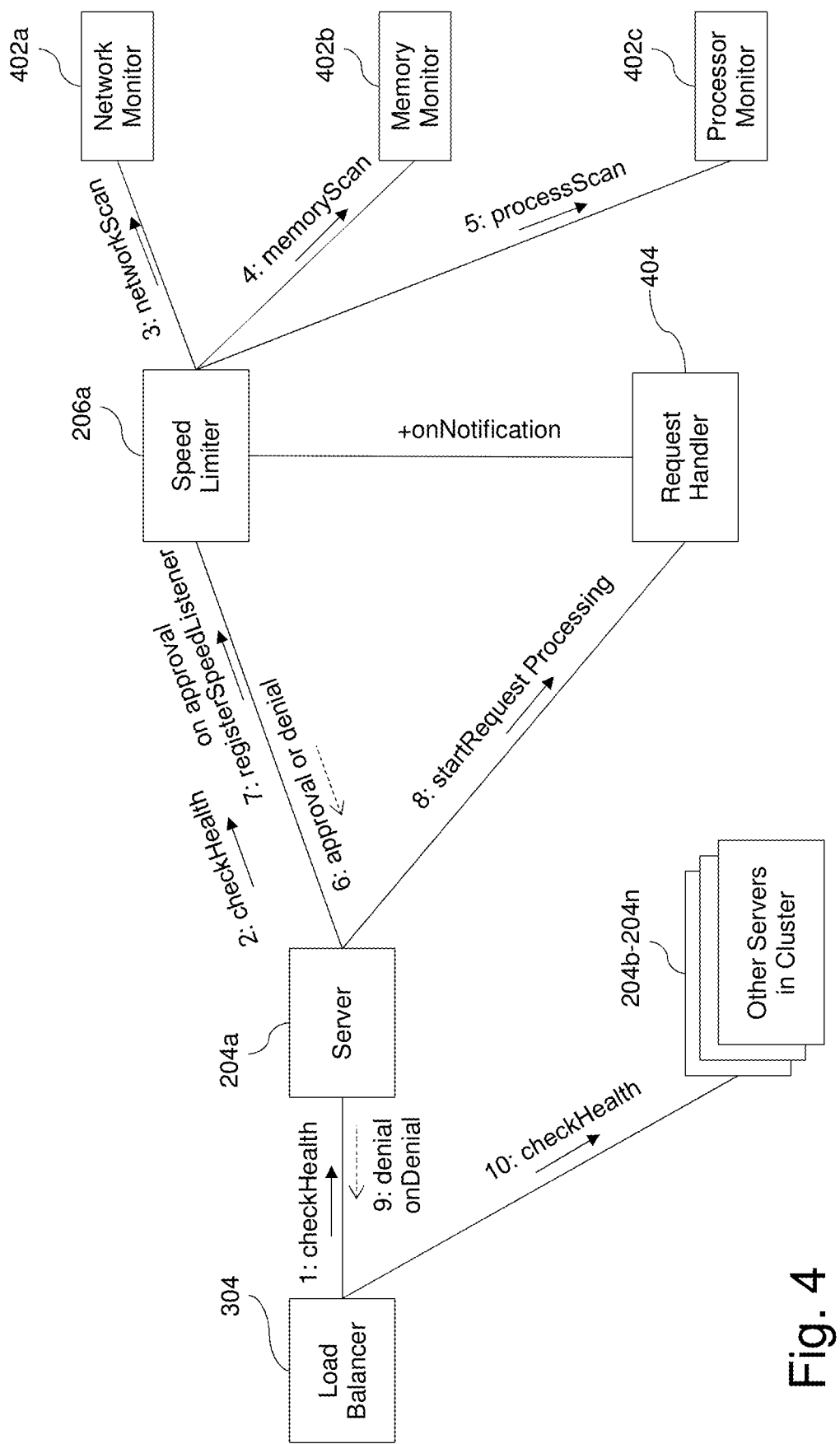
FIG. 4 is a block diagram illustrating server-side operations mediated by a speed limiter, in accordance with certain example embodiments.

FIG. 4 is a block diagram illustrating server-side operations mediated by a speed limiter, in accordance with certain example embodiments.

Stage 1: The process begins with a client request (e.g., a request to upload or download a file in connection with a file transfer server). If there is a load balancer 304 deployed in the network (e.g., on top of the speed limiter 206a), then the load balancer 304 performs a health check operation. If the load balancer 304 is not installed, then this operation is omitted. Here, the load balancer 304 is checking the health (e.g., available memory, network usage, capability of receiving a new connection, etc.) of the server 204a. As noted in more detail below, if the server 204a is in good health (and thus the client request is approved), the load balancer 304 hands over the request to the server 204a; otherwise, the load balancer 304 checks other servers in the cluster.

Stage 2: When a new client request is received by the server 204a (e.g., from the load balancer 304 in a network cluster configuration, directly from a client in the case of standalone server, etc.), the server 204a requests a health check from the speed limiter 206a. In certain example embodiments, the health check operation from the load balancer 304 is simply passed from the receiver of the server 204a to the speed limiter 206a.

Stages 3-5: Once the client request is received by the speed limiter 206a, the speed limiter 206a initiates checks of current runtime parameters (such as, for example, network availability and bandwidth utilization, memory usage, processor usage, and/or the like). In the FIG. 4 example, the speed limiter initiates network, memory, and process scans using the network monitor 402a, memory monitor 402b, and processor monitor 402c. These scans may be performed in connection with the sensors noted above. Once this data is obtained, the speed limiter 206a applies a set of rules and patterns to help predict the total resource usage. As will be appreciated from the description below, example rules and patterns may be include peak time, client impact, and/or file impact models. For instance, with respect to example peak time and client impact models, as and when the raw datasets are converted to models, they are grouped based on time, so that it becomes possible to form a stronger model. The raw datasets may be thought of basically as being inputs to predictors. It is noted that a difference of a few seconds or even a few minutes should not impact the quality of predictions in many scenarios. A new parameter frequency may be added, e.g., to maintain a record of the repetitions so, for example, the higher the frequency, the stronger the prediction is likely to be. This model may grow stronger over time, and the calculated standard deviation of the frequency parameter (for example) is a metric that may help in prediction-related operations. With respect to the file impact model, a list of file names, file types, and sizes, may be maintained. For a new request that does not have file metadata (e.g., is lacking some or all of this data), a search of this model may be made to try to locate a potential or probable match. It then may be possible to provide a prediction, even when some or all of this file-related information is not known in advance. It will be appreciated that, with more usage, this model may grow stronger with more information essentially in its dictionary, enabling it provide better predictions.

Stage 6: Based on the previous computation, the speed limiter 206a either denies or accepts the client request for further processing. An approval determination proceeds to Stage 7, whereas a denial determination proceeds to Stage 9.

Stage 7: In the event of an approval, a speed listener is registered. As explained in greater detail below, the registered speed listener is used by the speed limiter 206a to control the processing power.

Stage 8: Following the registration of the speed listener, the server 204a starts processing the request, e.g., using a request handler 404. The connection between the speed limiter 206a and the request handler 404 demonstrates the link between these components and, as described below, the speed limiter 206a can control the speed of the transfer by sending notifications along this link.

Stage 9: These operations take place in the event that the Stage 6 determination results is a denial. If the request was made directly from a simple client, the result is a denied transfer because of the server 204a being busy. On the other hand, if the request was made through the load balancer 304, then the denial message will be propagated to the load balancer 304, so that the load balancer 304 can hand over the request to other nodes in a server.

Stage 10: The operations here essentially return to Stage 1, with other servers in the cluster.

Figure 1:
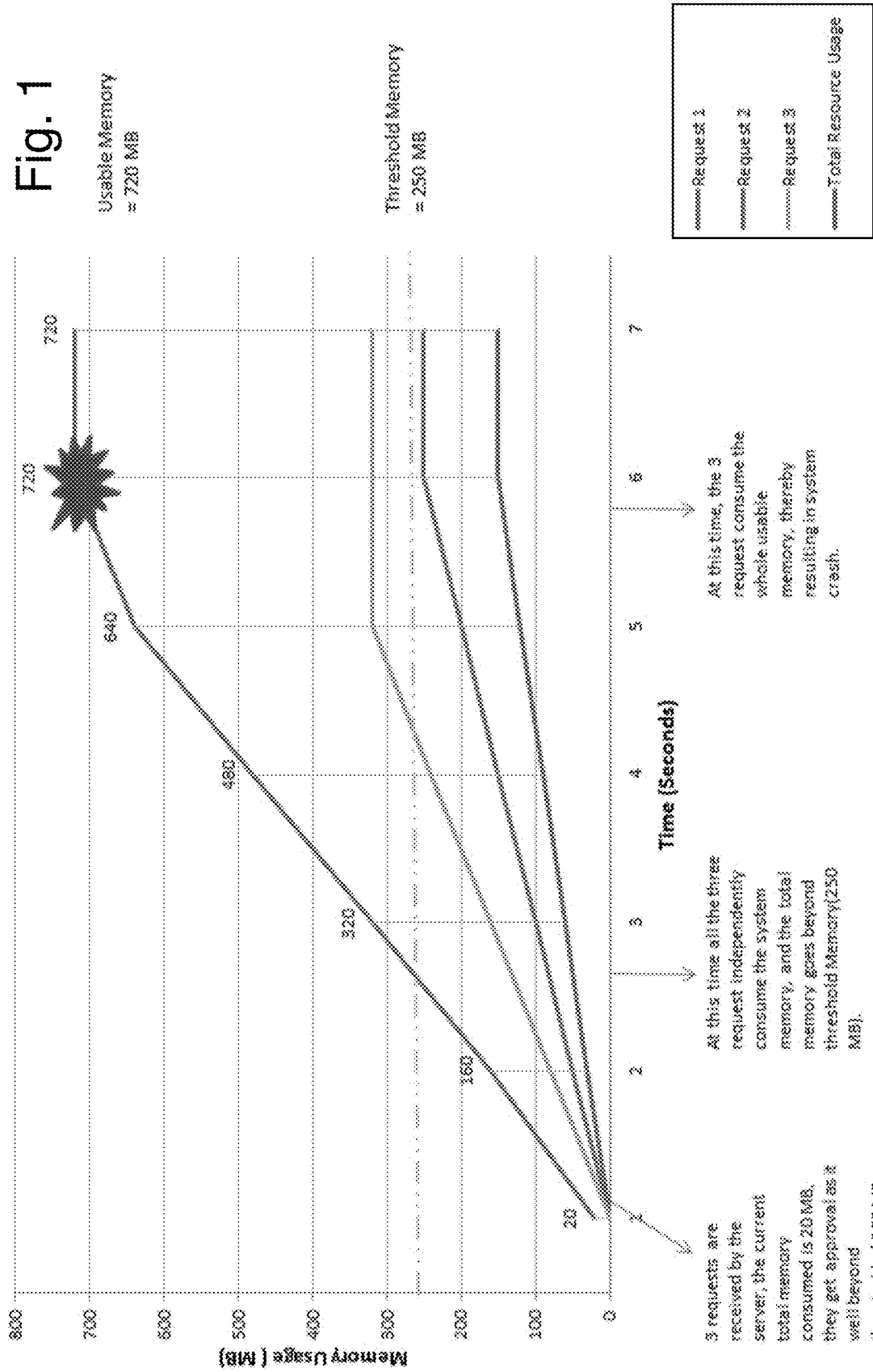
FIG. 1 is a chart showing how a conventional approach to handling network resource utilization can be problematic in certain example scenarios.
Figure 5:
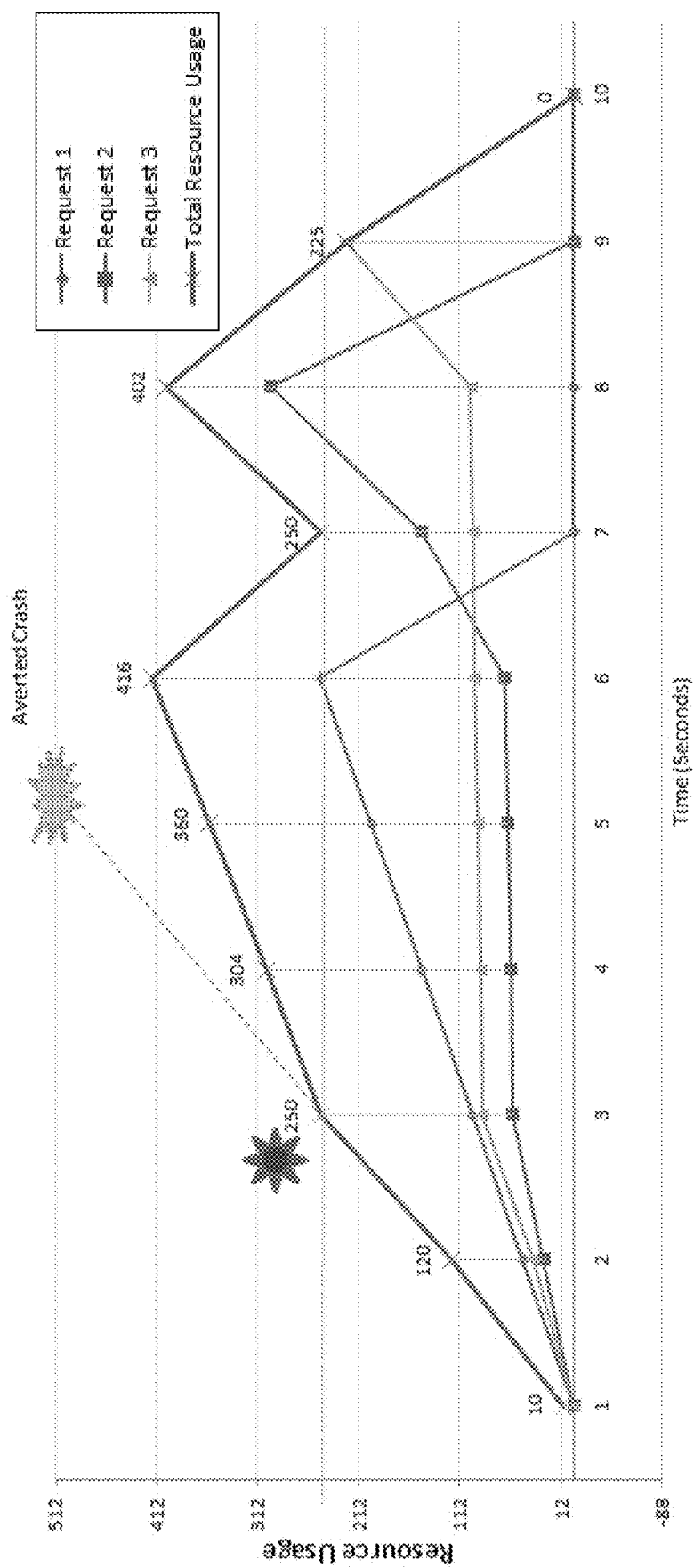
FIG. 5 is a graph, similar to that shown in FIG. 1, showing how the speed limiter of certain example embodiments can be used to avert system crashes.

FIG. 5 is a graph, similar to that shown in FIG. 1, showing how the speed limiter of certain example embodiments can be used to avert system crashes. In FIG. 5, the initial memory resource threshold is set at 250 MB, and the maximum usable memory resources is set at 512 MB. Beyond 512 MB, a crash will take place. At time t=1, the system accepts all three requests together, as the total resource usage is well below the initial resource threshold.

At time t=2, all requests contribute to 120 MB of memory usage. At time t=3, the requests contribute to 250 MB of data usage, and the initial resource threshold is reached. Benefits of the speed limiter of certain example embodiments can begin to be seen. In this regard, if the memory usage is not controlled, the system would reach crash at the time t=5. However, here, the server stops accepting new requests based on instructions from the speed limiter. The speed limiter also starts controlling the processing of existing requests. In this case, the speed limiter allows only request 1 to proceed, throttling requests 2 and 3.

At time t=4 through time t=6, the speed limiter slows down requests 2 and 3 (and in this example, stops them completely), thereby preventing the server from crashing. In addition, it sends messages to the clients, preventing them from timing out. At time t=6, request 1 is complete. Thus, the memory used in connection with fulfilling request 1 is cleared. The speed at which request 2 is processed then increases. In this example, request 3 remains paused. At time t=7, request 2 is processing at "full speed," while request 3 is still throttled, given that the memory usage is still above initial resource threshold. In this sense, it will be appreciated that throttling can include reducing the speed all the way to zero, in certain example instances.

At time t=8, request 2 completes execution, and the memory occupied by request 2 is cleared. Request 3 then resumes processing. At time t=9, request 3 continues execution. The memory usage is below the initial resource threshold, so the system is ready to accept new connection requests. At time t=10, request 3 completes execution, and the memory associated with fulfilling this request is freed. At time t=10, request 3 completes execution, and the memory is freed.

Advantageously, there are no crashes in this example. The maximum memory resources used in the FIG. 5 example is 416 MB, which is below the maximum usable memory resources threshold. Also advantageously, further requests are not completely denied and ongoing requests are merely "paused," as timeout messages are not sent to the associated clients.

Figure 6:
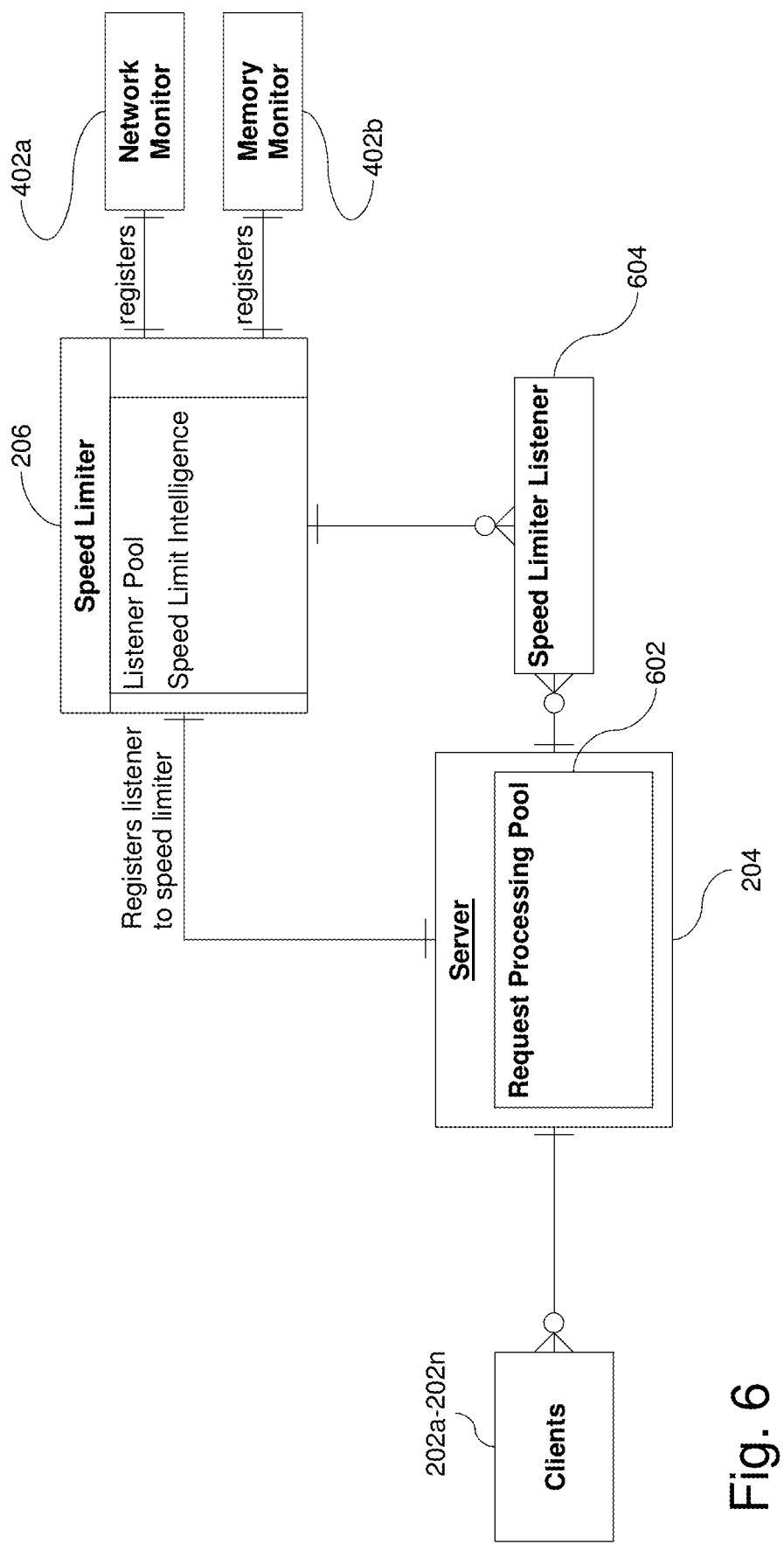
FIG. 6 is a simplified view that depicts, at a high level, relationships between components provided by certain example embodiments.

FIG. 6 is a simplified view that depicts, at a high level, relationships between components provided by certain example embodiments. The clients 202a-202n make multiple requests (e.g., file transfer related requests) to the server 204. The server 204 includes a request processing pool 602, which handles the various requests made by the clients 202a-202n. The speed limiter 206 monitors the network and memory, and selectively controls the processing of the requests. It registers various monitors, as described above. FIG. 6 shows a network monitor 402a and a memory monitor 402b, although these and/or other monitors may be registered in different example embodiments. The listener pool of the speed limiter 206 holds references to the actual requests and issues notifications related to them (e.g., to the associated clients) from time-to-time. These notifications may include pause messages (e.g., to at least temporarily halt the processing of the requests), resume messages (e.g., to resume temporarily halted processing), "keep alive" messages (e.g., to ensure that the requests that have been temporarily paused do not time out), etc. The server 204 may register speed limiter listener instances 604 to the speed limiter for the various requests. The speed limit intelligence component of the speed limiter 206 applies predefined and/or machine learned rules to determine whether to adjust transfer speeds, how to adjust transfer speeds, etc., e.g., so as to help avert system crashes.

The speed limiter listener 604 in certain example embodiments is implemented as an interface that an ongoing transfer implements to receive notifications from speed limiter 206. Thus, for each ongoing transfer, there will be individual speed limiter listener 604 registered with the speed limiter 206. The server 204 will have a pool of ongoing transfers. Thus, in some example instances, one server can have many ongoing transfers or speed limiter interfaces. The speed limiter 206 holds a reference to the above listeners. Accordingly, for one speed limiter, there may be many speed limiter listeners. The speed limiter 206, for every speed modification request to the ongoing transfers, calls the onNotification( ) method of the speed limiter listener 604.

Figure 7:
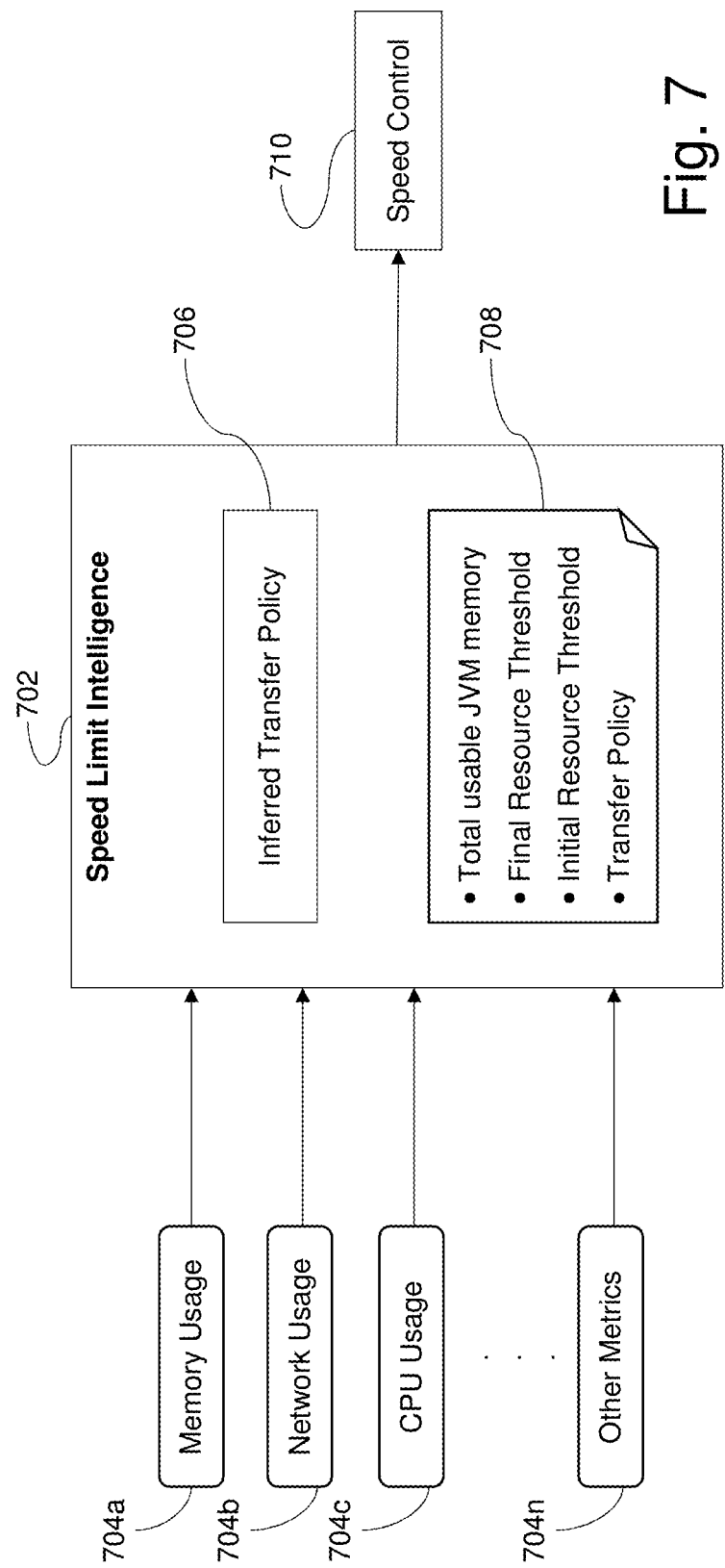
FIG. 7 is an overview of the speed limit intelligence that may be used in connection with certain example embodiments.

FIG. 7 is an overview of the speed limit intelligence that may be used in connection with certain example embodiments. As shown in FIG. 7, the speed limit intelligence component 702 takes inputs 704a-704n and uses them for speed control 710 of the requests being handled by the server. Speed control may be defined in terms of, for example, a wait time after each chunk of data is processed and/or chunk size (e.g., wait 10 ms after each chunk is processed, and define a chunk to be 32,768 bytes). As explained above, the inputs 704a-704n may include, for example, memory usage 704a, network usage 704b, CPU usage 704c, and/or other metrics 704n. In addition to considering these current runtime metrics, the speed limit intelligence component 702 also may consider preconfigured settings 708.

Certain example embodiments thus may be thought of as creating back-offs by adjusting wait time and/or chunk size. Back-offs may be calculated in any suitable way. For instance, back-offs may involve fixed time durations and/or chunk sizes, adaptable time durations and/or chunk sizes, etc. The decision on how to back-off may be made by the decision aggregator which, for example, on periodic scans of the requests, gives each a factor specific for the request. In certain example embodiments, the factors considered may be as shown in and discussed in connection with FIG. 12. Five "end states" with predefined parameters (e.g., waitTimeAfterEachChunkProcessing and chunkSize) are shown in this example. A request based on its past behaviors/transfer stats/file size/current resource status/etc., may be assigned these and/or other back-off parameters, to control the processing of the request and associated file transfer.

The preconfigured settings 708 of certain example embodiments may include, for example, information concerning the maximum usable resources, initial resource threshold, final resource threshold, and/or applied transfer policy or policies. In the case of a Java application, for example, the maximum usable resources may be defined in terms of the total usable resource in the Java Virtual Machine (JVM), such that consuming the complete resource will result in a system crash. An example here is that the total usable JVM memory is 720 MB. As explained above, the initial resource threshold is the limit above which the speed limiter starts controlling/limiting requests, so as to actively try to avert system crashes. Beyond this limit, the speed limiter does not accept any new connections and/or may simply hold new connections until the potential issue(s) is/are resolved. An example here is that the initial resource threshold may be 250 MB.

The final resource threshold is the limit above which the speed limiter completely stops other requests and focusses on completing a given request. If the memory usage touches the final resource threshold level (e.g., the configured maximum usable resource level), the speed limiter uses the memory on disk (or other non-transitory computer readable storage media and/or slower storage media) instead of keeping request-related activities in the JVM memory. Requests sent to disk will be taken up after completing other requests. An example final resource threshold level is 420 MB.

The given request selected for completion may be selected in any suitable manner. For example, the request that is selected may be random, the oldest, the newest, the largest, the smallest, the request associated with the most critical operation and/or important user, the closest to completion, etc. The predictors also may impact which request is processed. In certain example embodiments, as the system is in a situation of attaining a resource crunch in the near future, the speed limiter may choke all of the requests and then allow requests one-by-one with controlled processing. As mentioned in the example R1, R2, and R3 are three requests that started at the same time and will be monitored individually by the decision aggregator (DA) at the beginning, as well as through periodic scans. At time t=4, the decision aggregator stopped R2 and R3, based on the input from predictors. That is, in this example, the peak time impact predictor is the same for all of the requests, so this does not differently impact these individual requests. The client impact predictor will disallow/delay malicious clients. The file type impact predictor will indicate that files with lesser sizes are to be given more priority, files with known lesser sizes (e.g., from the file metadata), are to be given more preferences than files with predicted sizes, etc. Of course, it will be appreciated that other considerations may be taken in account in connection with, or in place of, these above-described factors.

One or more transfer policies also may be user defined. For example, IP banning (e.g., block all IP addresses at IP address 10.209.208.*), IP whitelisting, etc., may be manually configured by an authorized user to restrict known malicious actors, etc. Port blocking also may be a part of the one or more transfer policies. Throttling also may be predefined. Here, throttling represents manually applied user-configured restrictions.

The inferred transfer policy is a machine learning component that which monitors transfer stats and, over time, learns behaviors of transfers. Learned behaviors may include, for example, the amount of memory consumed for the transfer of specific files and/file types (e.g., the memory consumed by some particular file names or type of files); transfer rates specific to clients (e.g., as some client machines consume more memory and are more demanding on the network than others); peak hours of transfer (e.g., related to the system's own operation and/or other products in the system); priority clients (e.g., to identify malicious clients and/or understand the clients and their behaviors, potentially reject requests on during critical time periods, etc.); and/or the like.

Figure 8:
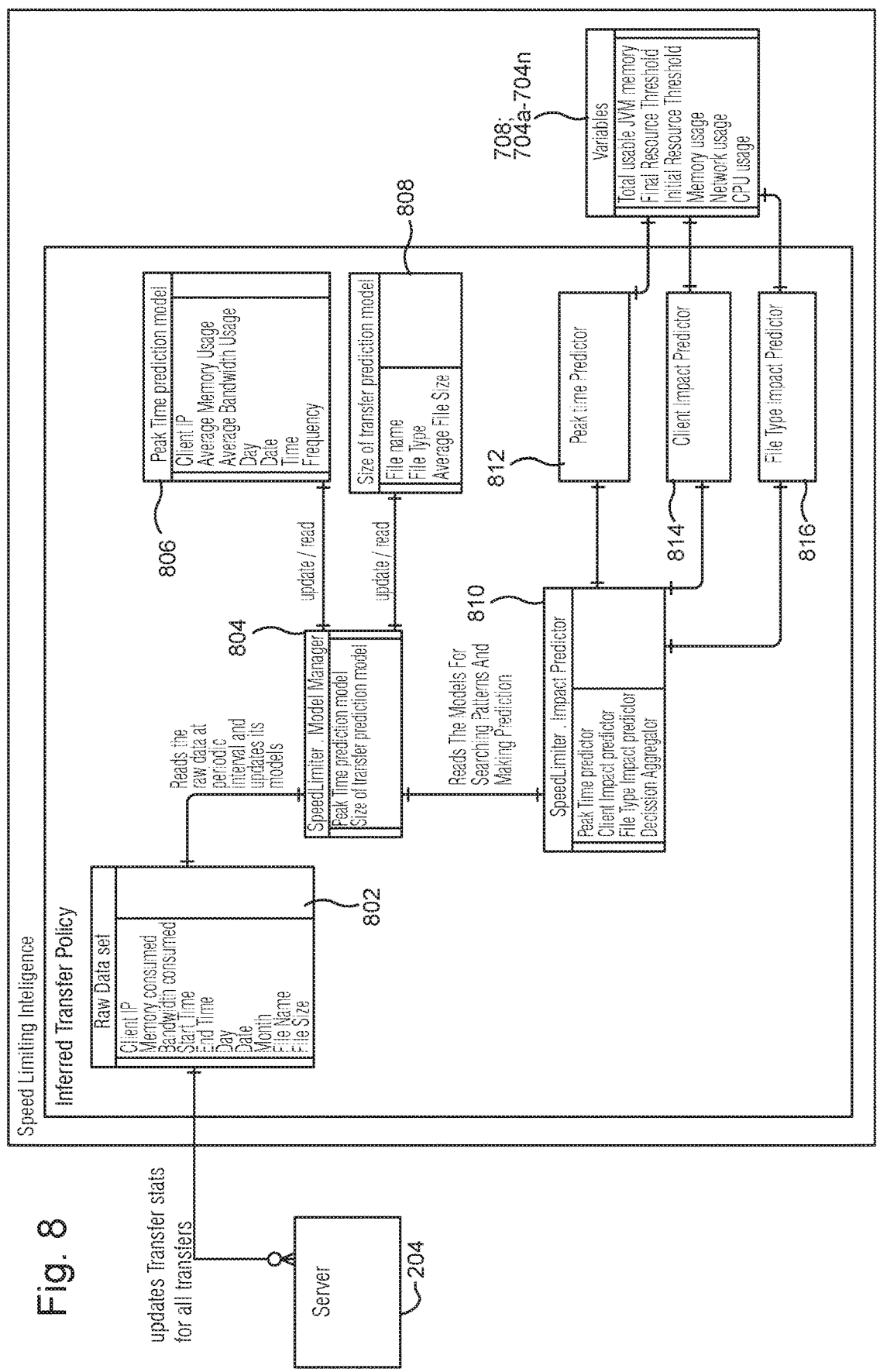
FIG. 8 is a diagram providing further detail as to how the speed limiter's learning component functions, in accordance with certain example embodiments.

FIG. 8 is a diagram providing further detail as to how the speed limiter's learning component functions, in accordance with certain example embodiments. With each transfer, transfer statistics are stored in a data structure. In the FIG. 8 example, the raw data set 802 is the data structure, and it stores information, for each request, including: the requesting client's IP address, the amount of memory consumed by the request, the bandwidth consumed, time stamp information such as start/send times and day/date/month information, the file name, the file size, etc. File type information also may be stored in some instances. At least some of this information is based on data retrieved from the server 204.

The speed limiter's model manager 804 includes a peak time prediction model 806 (which includes aggregated and cleaned data describing the peak time usage) and a size of transfer prediction model 808 (which contains a dictionary or registry of file size and file type information). The model manager 804 reads raw data at periodic intervals and/or when requested by an authorized user and updates its models. The peak time prediction model 806 may take into account client IP information, average memory usage, average bandwidth usage, timestamp information, length of time taken for a request, frequency of requests, etc. The size of transfer prediction model 808 may take into account file name, file type, and average file size information.

The model manager 804 communicates with the impact predictor 810, which includes a peak time predictor 812, client impact predictor 814, and file type impact predictor 816. The peak time predictor 812 uses the peak time prediction model 806, the configured parameters, and current memory status, and predicts the impact of the transfer request. From the prediction, a determination can be made as to whether a given request should be allowed to execute, whether to adjust the speed of a given request, etc. The client impact predictor 814 uses the peak time prediction model 806 to identify a given client and its impact on the server, determine whether that client is allowed to execute a new request, whether to adjust the speed of requests associated with that client, etc. The file type impact predictor 816 uses the size of transfer prediction model 808 to identify the memory or size of the file and thus helps in predicting the memory consumption, e.g., at the beginning of the request.

A decision aggregator aggregates the output from the predictors and determines the impact of the request if it is allowed to execute. If the impact is predicted to go beyond the threshold limit, the request is denied, or processed in a controlled way. The decision aggregator in certain example embodiments may be programmed as a computer module (e.g., software) configured to execute functionality defined in connection with FIG. 12, for example. In this regard, the decision aggregator may help to aggregate the predictions performed by the peak time, client impact, file type, and/or other predictors. The predictors themselves in certain example embodiments take the configuration parameters (e.g., initial threshold, final threshold, total memory, memory/resource scan results, etc.) and also predictor-specific parameters, to output predictions.

The following table provides examples as to how the different types of data mentioned above can be used in the peak time prediction model 806 and/or size of transfer prediction model 808, in certain example embodiments:

| Raw Data Set | Peak Time Model | Size of Transfer Prediction Model |
|---|---|---|
| Client IP<br>Client Rank | Client IP<br>Averaged Client Rank<br>Here, rank refers to the<br>genuineness of the client.<br>The higher the ranking, the | |

-continued

| Raw Data Set | Peak Time Model | Size of Transfer Prediction Model |
|---|---|---|
| | more trusted the client. Low rankings may be indicative of banned IPs, malicious users, etc. | |
| Memory Consumed (Ex: 350 MB, 450 MB, 450 MB, 300 MB, 350 MB, 500 MB, 900 MB) | Average Memory Consumed Average effective memory consumed by the clients for the particular time group, after discarding noises. In this example series, a probable distortion of 900 MB is present, so the average value is calculated excluding that likely aberration. Average Memory consumed can be 400 MB. This indicates that the memory usage was once averaged to be 400 MB. Max memory Consumed The value in this example series is 900 MB. | Average Memory Consumed |
| Transfer Speed | Average Bandwidth Consumed Calculated on the basis of memory consumed and transfer speed. Average Bandwidth consumed can be 200 MBps. This indicates that the bandwidth usage was once averaged to be 200 MBps. | |
| Start time (Ex: 6:05:05, 7:10:15, 7:34:38) End Time (Ex: 6:08:05, 7:12:15, 7:36:38) | Time Group The mentioned timeframe can be grouped to a predefined time grouping. In this case, the time grouping may be 6am to 8am. | |
| Day, Date, Month | Day, Date, and Month Values | |
| Filename (Ex: org.eclipse.osgi__3.10.000-0023.jar apache-tomcat-8.5.29.tar.gz) File Size | | Filename Filenames with versions truncated to capture more matches. Ex: org.eclipse.osgi__*.jar apache-tomcat-8.*.tar.gz Average File Size Outliers may be removed in some instances. |
| File Type | | File Type |
| Frequency | Frequency Number of times the data occurred in the raw data set. The higher the frequency, the stronger the probability of the prediction. | Frequency Number of times the data occurred in the raw data set. The higher the frequency, the stronger the probability of the prediction. |

Figure 9:
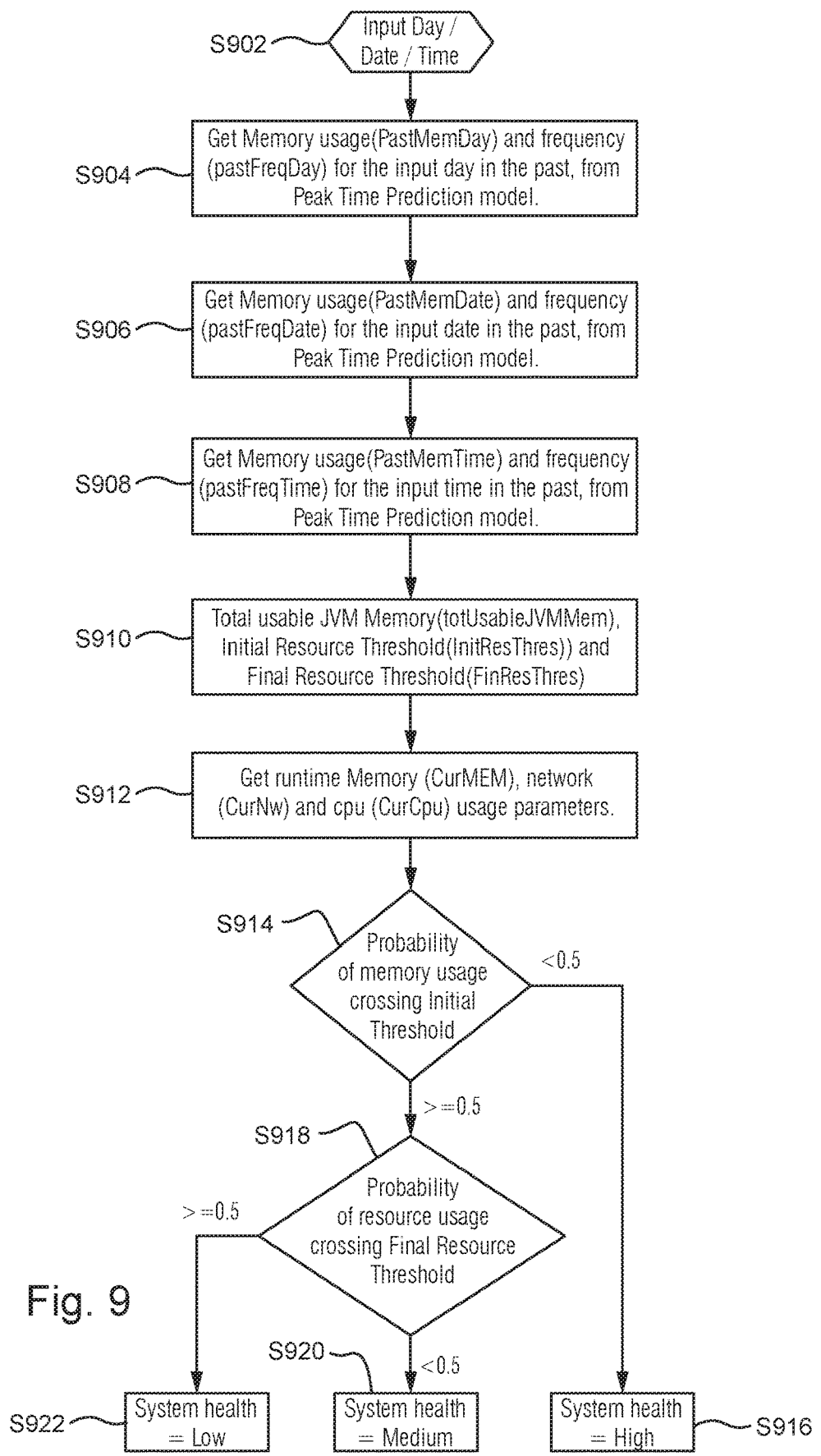
FIG. 9 is a flowchart showing how a peak time predictor may operate, in accordance with certain example embodiments.
Figure 10:
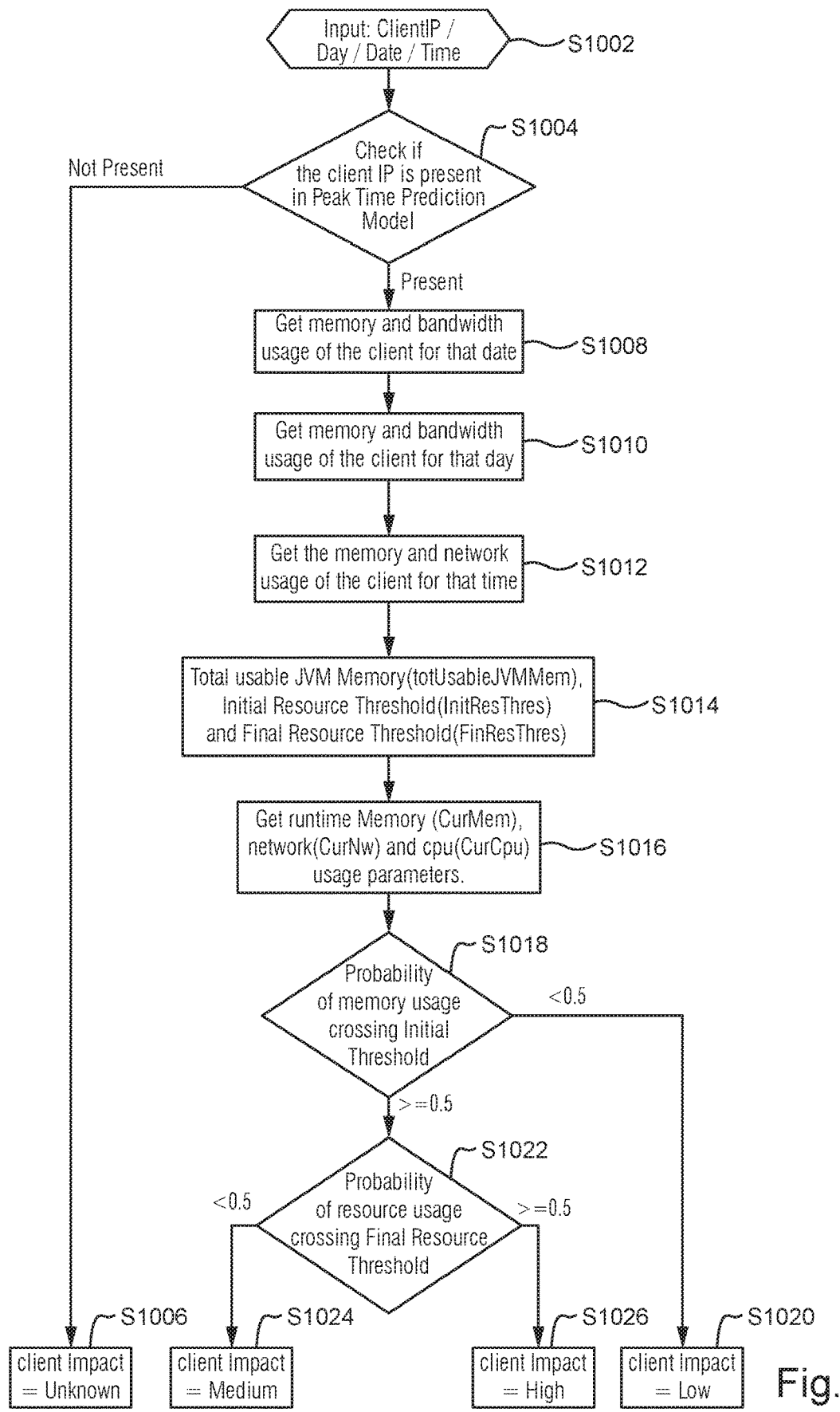
FIG. 10 is a flowchart showing how a client impact predictor may operate, in accordance with certain example embodiments.
Figure 11:
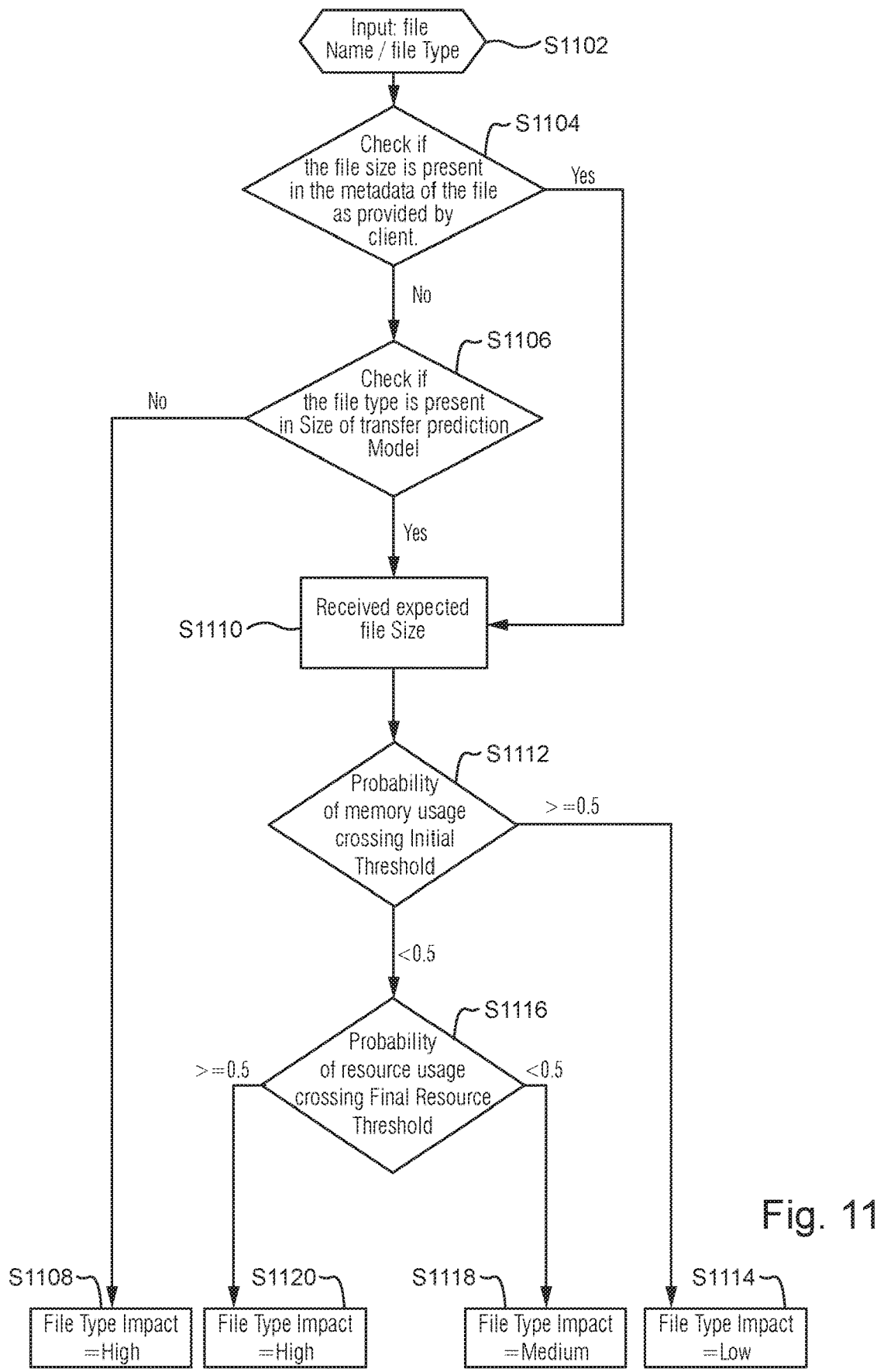
FIG. 11 is a flowchart showing how a file type impact predictor may operate, in accordance with certain example embodiments.

FIGS. 9-11 provide examples as to how the impact predictors can arrive at different discrete impact classifications, in accordance with certain example embodiments. As will be appreciated from the descriptions below, probability determinations are based on (1) identifying patterns; (2) current snapshots of memory, network conditions like available bandwidth, and/or the like, (3) a prediction of the total memory consumed by a client, even before it gets approval regarding its request; and (4) manually-configured transfer policies and/or other parameters. With respect to (1), with the amount of raw data growing with every request, and the model learns to be more accurate for prediction purposes. Identifying peak times in the environment, "repeat" clients, and file metadata, for example, can be useful for refining the models. With simple throttling, simple rules might not address repeated scenarios or patterns specific to a system, which could have been identified over periods of usage. By contrast, certain example embodiments monitor the file transfers, learn, and then identify such scenarios beforehand—and then try to avert crashes. By taking a snapshot of the current health of the system, matching it with earlier identified patterns, and managing requests accordingly, benefits beyond simple throttling can be achieved.

FIG. 9 is a flowchart showing how a peak time predictor may operate, in accordance with certain example embodiments. The FIG. 9 flowchart receives as input in step S902 information concerning the day, date, and time. In step S904, the peak time prediction model is consulted to determine memory usage and frequency information for the input day in the past. That is, the input in certain example embodiments specifies the day/date/time, when the scan was done. Suppose, for example, there is a new request or a periodic scan request at 4 May 2018 13:00:00. The date is 4, day is Friday, and time is 13:00. As an example, the peak time predictor, which analyzes the peak time, would analyze the system load occurring at past occurrences at the 4th of every month, on Fridays, at 13:00, etc. The frequency of the past occurrences of the above three inputs (day/date/time) may be considered individually and also as combinations to predict the system health. In step S906, the peak time prediction model is consulted to determine memory usage and frequency information for the input date in the past. In step S908, the peak time prediction model is consulted to determine memory usage and frequency information for the input time in the past. Stored variable information is retrieved in step S910. In this example, that includes the total usable JVM memory, initial resource threshold, and final resource threshold values. Current runtime information is retrieved in step S912. In this example, that includes memory utilization, network utilization, and CPU utilization. In step S914, the probability of memory usage crossing the initial threshold is determined and, if the probability is less than a preconfigured threshold (e.g., less than 50% in this example), then the system health is determined to be high in step S916.

On the other hand, if this is not the case, then the probability of resource utilization cross the final resource threshold is calculated in step S918. If that probability is less than a preconfigured threshold (which may be the same as or different from the threshold above), then the system health is determined to be medium in step S920. If that probability is greater than or equal to that preconfigured threshold, then the system health is determined to be low in step S922.

FIG. 10 is a flowchart showing how a client impact predictor may operate, in accordance with certain example embodiments. The FIG. 10 flowchart receives as input in step S1002 information concerning the day, date, and time, as well as the client IP address making a request. In step S1004, a check is made to determine whether client IP address is present in the peak time prediction model. If it is not, then the client impact is deemed unknown in step S1006. If it is, the memory and network usage of the client for that date is retrieved in step S1008, memory and network usage of the client for that day is retrieved in step S1010, and memory and network usage of the client for that time is retrieved in step S1012. Stored variable information is retrieved in step S1014. In this example, that includes the total usable JVM memory, initial resource threshold, and final resource threshold values. Current runtime information is retrieved in step S1016. In this example, that includes memory utilization, network utilization, and CPU utilization. In step S1018, the probability of memory usage crossing the initial threshold is determined and, if the probability is less than a preconfigured threshold (e.g., less than 50% in this example, which may be the same as or different form the threshold in FIG. 9), then the client impact is determined to be low in step S1020.

On the other hand, if this is not the case, then the probability of resource utilization cross the final resource threshold is calculated in step S1022. If that probability is less than a preconfigured threshold (which may be the same as or different from the threshold above), then the client impact is determined to be medium in step S1024. If that probability is greater than or equal to that preconfigured threshold, then the client impact is determined to be high in step S1026.

FIG. 11 is a flowchart showing how a file type impact predictor may operate, in accordance with certain example embodiments. The FIG. 11 flowchart receives as input in step S1102 information concerning the filename and file type associated with a request. In step S1104, a check is made as to whether the file size is present in the metadata of the file, as provided by the client. If that is not the case (and if it cannot otherwise be determined), the process proceeds to step S1106, where a determination is made as to whether the file type is present in the size of transfer prediction model. If it is not, then the file type impact is deemed unknown in step S1108.

On the other hand, if the file size is present in the metadata of the file, as provided by the client (or otherwise can be determined) in step S1104, and/or the file type is determined to be present in the size of transfer prediction model in step S1106, then the process proceeds to step S1110, where the expected file size is received. In step S1112, the probability of memory usage crossing the initial threshold is determined and, if the probability is less than a preconfigured threshold (e.g., less than 50% in this example, which may be the same as or different form the threshold in FIG. 9 and/or FIG. 10), then the file type impact is determined to be low in step S1114.

On the other hand, if this is not the case, then the probability of resource utilization cross the final resource threshold is calculated in step S1116. If that probability is less than a preconfigured threshold (which may be the same as or different from the threshold above), then the file type impact is determined to be medium in step S1118. If that probability is greater than or equal to that preconfigured threshold, then the file type impact is determined to be large in step S1120.

Figure 12:
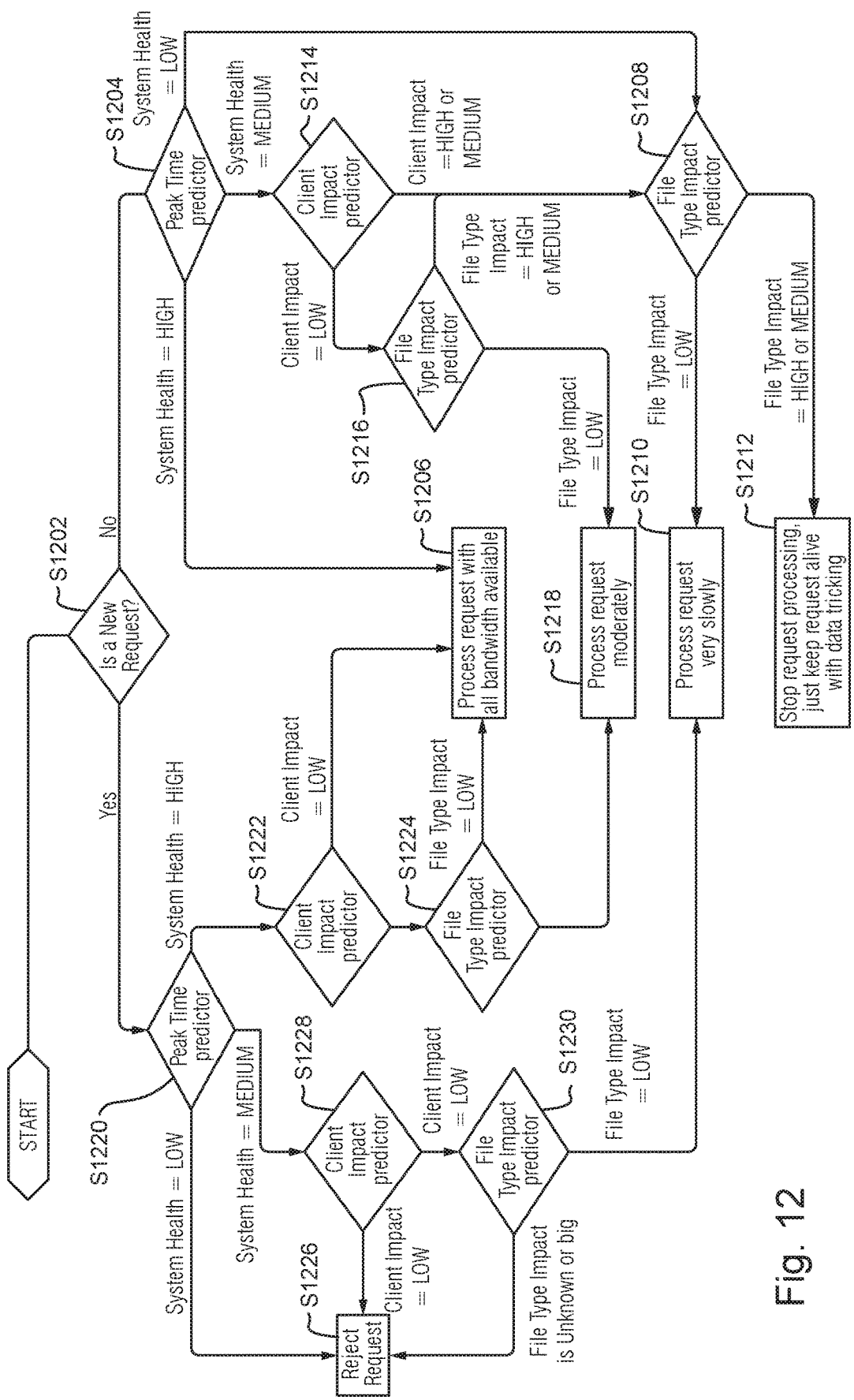
FIG. 12 is a flowchart showing how the various impact predictors can be used to influence operations of the server, in accordance with certain example embodiments.

FIG. 12 is a flowchart showing how the various impact predictors can be used to influence operations of the server, in accordance with certain example embodiments. As noted above, FIG. 12 represents core functionality of the decision aggregator in certain example embodiments. In brief, this approach consumes results from the three predictors shown FIGS. 9-11 and arrives at a decision as to the nature of the overall system (e.g., whether it is running well, in critical condition, etc.). As shown in FIGS. 9-11, the predictors take the configuration parameters (e.g., initial threshold, final threshold, total memory, memory/resource scan results, etc.) and also predictor specific-parameters, to provide predictions. The execution of the approach shown in FIG. 12 may occur at the beginning of a new request and/or periodically in connection with every running request. In other words, the speed limiter may in essence help guide the file transfer to controlled processing right from the beginning of the transfer until it is executed completely.

Referring now more particularly to FIG. 12, in step S1202, the determination is made as to whether a new request is being processed. If not, output from the peak time predictor is taken into account in step S1204. If the system health is high, then the request is processed with all available bandwidth in step S1206. If the system health is low as determined in step S1204, then output from the file type predictor is taken into account in step S1208. If the file type impact predictor is low, then the request is processed slowly in step S1210. However, if the file type impact predictor is not low, then the request processing is paused, and kept alive with data trickling, in step S1212. When transferring a file (for example), there is an idle timeout set by/for the associated client. When there is no transfer during this time period, the session times out. For such known scenarios, data trickling may be used to hold back the session by sending a few bytes of data in order to keep the session active. In certain example embodiments, when there is a low resource level predicted by the speed limiter, some of the requests may be held back. But in doing so, the session likely would time-out. Accordingly, the speed limiter may implement data trickling, by sending a few bytes of data, which would have a negligible impact on the resource usage, while helping to prevent the session from timing-out. If the system health is medium as determined in step S1204, then output from the client impact predictor is taken into account in step S1214. If the client impact is not low, then the determinations made in connection with step S1208, etc., are made. On the other hand, if the client impact is low as determined by step S1214, the file type impact predictor is taken into account in connection with step S1216. If the file type impact predictor indicates an impact other than low, then once again the determinations made in connection with step S1208, etc., are made. On the other hand, if the file type impact is low, then the request is processed at a moderate or intermittent in step S1218.

If the determination made in step S1202 indicates that it is a new request, then output from the peak time predictor is considered in step S1220. If the system health is determined to be high and the client impact predictor indicates that the client impact is low based on a determination made in connection with step S1222, then the request is processed with all available bandwidth in step S1206. If the system health is determined to be high in step S1220 but the client impact is not low based on the determination made in connection with step S1222, then the file type impact predictor is consulted in step S1224. Here, if the file time impact is low, then the request is processed with all available bandwidth in step S1206; otherwise, the request is processed at a moderate or intermittent in step S1218.

If the system health is determined to be low as a result of the determination made in step S1220, then the request is rejected in step S1226 (or potentially queued for later action). If the system health is determined to be medium, however, then the client impact predictor is consulted in step S1228. If the client impact does not equal low, then the request is rejected in step S1226 (or potentially queued for later action). Otherwise, the file type impact detector is consulted in step S1230. If the file type impact is determined to be large or unknown, then once again the request is rejected in step S1226 (or potentially queued for later action); otherwise, the request is processed slowly in step S1210.

Figure 13:
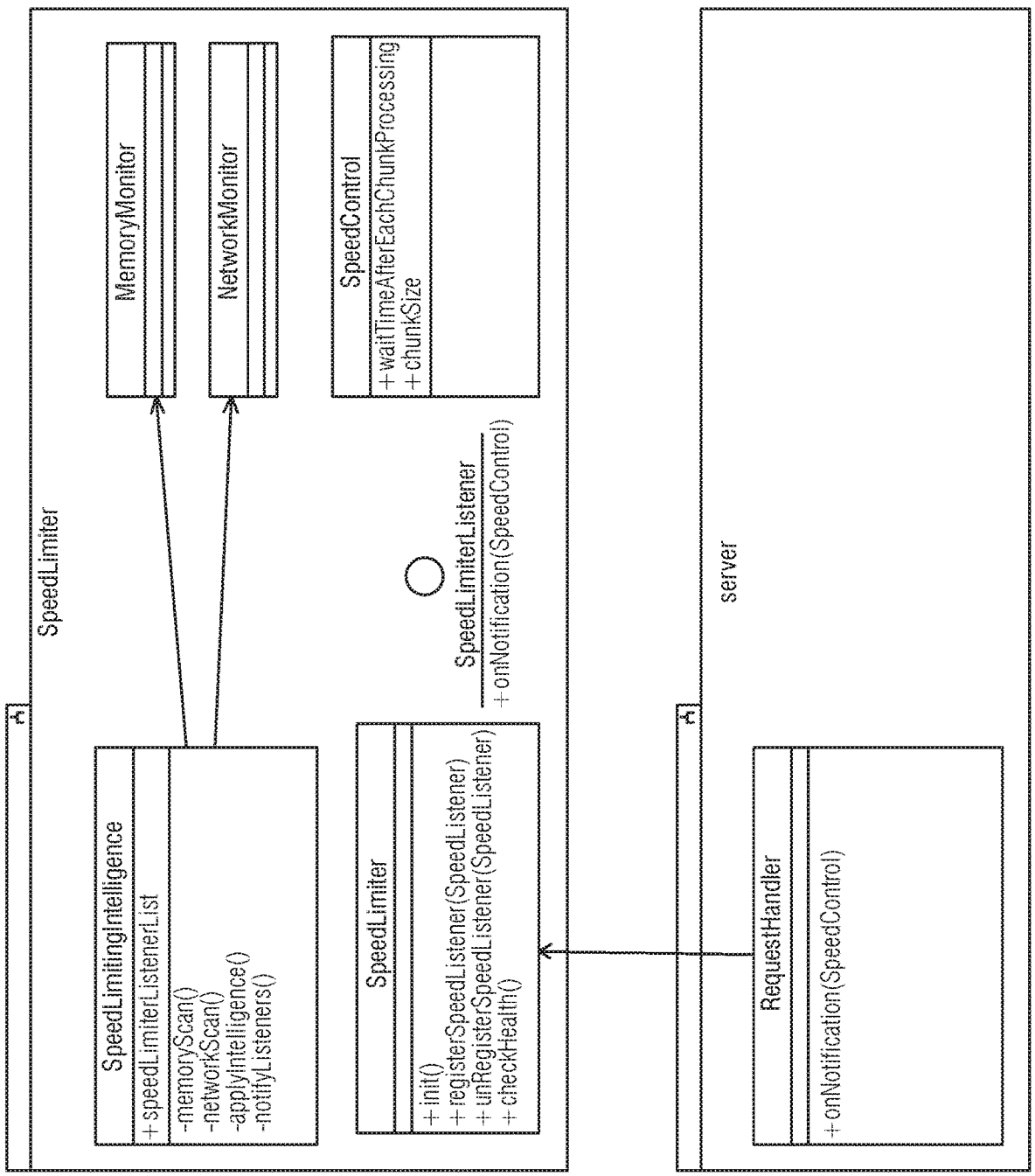
FIG. 13 is an example class diagram that may be used in connection with certain example embodiments.

FIG. 13 is an example class diagram that may be used in connection with certain example embodiments. More particularly, example classes that may be used in connection with the speed limiter and server are shown in FIG. 13. The corresponding functionality will be apparent from the descriptions provided above. For clarity, however, details concerning certain functions/methods listed in FIG. 13 will be provided:

applyIntelligence( ) is an internal function that triggers the decision aggregator, specifying an individual file transfer. This function communicates back the result of decision aggregator to the specific file transfer using the onNotification implementation. The file transfer responds to the notification (e.g., in connection with the SpeedControl object), thereby resulting in controlled processing.

notifyListeners( ) is an internal function that is called at a periodic interval in certain example embodiments. When this method is called, it checks the pool of listeners (e.g., for listeners that are active and running requests), and triggers applyIntellgence for each active request.

init and unRegisterSpeedListiner are "setup" and "teardown" methods. When a new request comes in, necessary initializations and a first time health check are performed. On completion of a file transfer or other request, de-initializations are performed.

Figure 14:
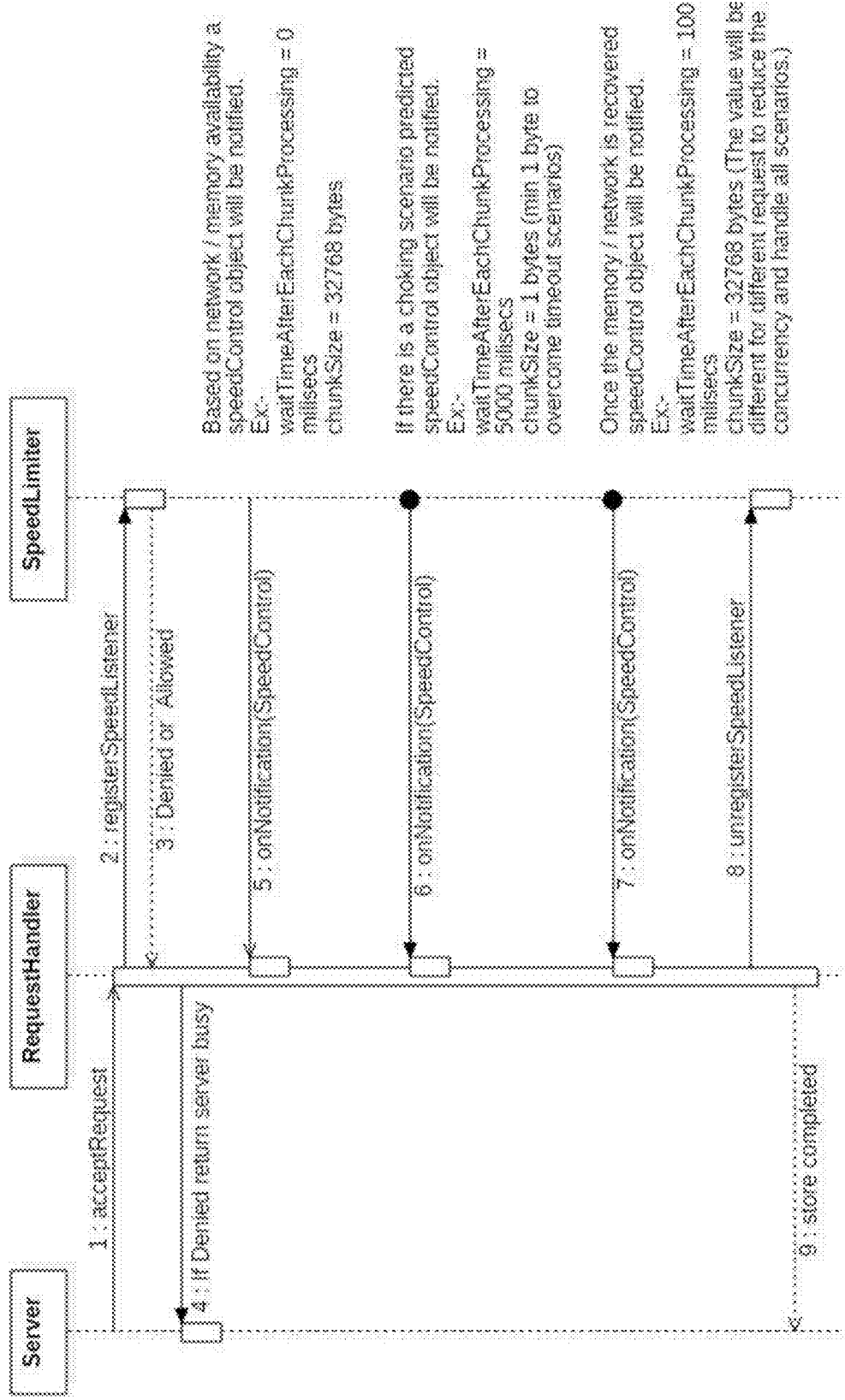
FIG. 14 is an example sequence diagram, demonstrating how the techniques of certain example embodiments may be used in connection with a more concrete working scenario.

FIG. 14 is an example sequence diagram, demonstrating how the techniques of certain example embodiments may be used in connection with a more concrete working scenario. A server accepts a new request, and the request handler then registers a new speed listener in connection with the speed limiter. The speed limiter makes a decision as to whether to allow or deny the request. If denied, the server indicates that it is busy and/or queues the request for later processing. If allowed, however, a notification for speed control is generated. In this initial pattern, based on the network utilization and memory availability, the speed control object is instructed to wait 0 ms after each chunk is processed, and each chunk is set at 32,768 bytes. Assuming next that a congestion scenario is predicted, then the speed control object is notified accordingly. For example, the wait time between processing subsequent chunks and/or the chunk size is/are adjusted. In this example, the wait time is increased to 5,000 ms, and the chunk size is reduced to 1 byte (which in certain example embodiments will be the minimum size needed in order to avoid timeout messages from being sent). Once the memory/network is normalized, the speed control object is notified, and the wait time between processing subsequent chunks and/or the chunk size is/are adjusted accordingly. In this example, the wait time is decreased to 100 ms, and the chunk size is increased to its initial value. It will be appreciated that the chunk size value may be different for different requests, e.g., to reduce potential concurrency issues and handle scenarios more gracefully. Once the request is completed, the speed listener is unregistered.

Certain example embodiments have been described in connection with file transfer related requests and file transfer servers. It will be appreciated that the example techniques disclosed herein have broader applicability. Indeed, the example techniques set forth herein may be used in connection with any application that involves, for example, handling large chunks of data uploaded/downloaded from a server or other device. Such applications may include virus scanning, searching, map-reduce functionality, asymmetric gaming, media service, and/or other applications. In general, the example techniques described herein are particularly advantageous in scenarios where large transfers and/or resource commitments are not necessarily predictable by a normal system at the initiation of the associated request (e.g., in situations where the amount of memory resources required by the server or other components are initially lower than predefined limits oftentimes imposed by load balancers and/or the like, where the client may not disclose the size of file(s) involved and/or the resources requested, etc.). Moreover, although client-server architectures are implicated in certain example embodiments, the technology disclosed herein is not so limited. That is, the technology disclosed herein may be used in connection with peer-to-peer and/or other network types and topologies in different example embodiments.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer network, comprising:
   a load balancer;
   one or more monitors;
   a non-transitory storage medium configured to store a plurality of machine learned models, the plurality of models including a first model and a second model, the first model being based on prior, time dependent, usage of the computer network in connection with serving transfer requests, the second model being based on data of transferrable files that are servable in response to transfer requests;
   a cluster comprising a plurality of servers, each said server including at least one processor, a memory, and a transceiver, wherein the servers are configured to:
      receive, from at least one client computing device that is remote to the computer network and via the load balancer, a plurality of requests to be processed; and
   a plurality of speed limiter modules, each said speed limiter module being associated with a respective one of the servers, each one of the plurality of speed limiter modules being configured to at least:
      receive, from the one or more monitors, current runtime status information pertaining to the computer network and the server associated therewith;
      execute, for each one of the plurality of received requests, a plurality of different predictor processes by using at least the first and second models of the plurality of models, each predictor process generating, for each one of the plurality of requests, a corresponding prediction for how a given request will impact a) the server associated therewith, and/or b) the computer network, wherein at least a first one of the predictor processes is executed by using the current runtime status information and at least a second one of the plurality of different predictor processes is executed based on data associated with a corresponding one of the plurality of received requests;
      determine, based on the plurality of corresponding predictions from the plurality of predictor processes, whether an incoming request is to be accepted by the server associated therewith;
      responsive to a determination that an incoming request is to be accepted, initiate processing of the incoming request via the server associated therewith;
      determine, based on the plurality of corresponding predictions from the plurality of predictor processes, whether the total resource usage of the server associated therewith exceeds or is likely to exceed an initial resource threshold; and
      responsive to a determination that the total resource usage of the server associated therewith exceeds or is likely to exceed the initial resource threshold:
      cease acceptance of further incoming requests; and
      control the speed at which requests currently being processed by the server associated therewith are being handled, such that (a) speeds of all but at least one of the requests currently being processed are throttled, (b) requests that are being throttled are neither terminated nor timeout nor handed over to another server in the cluster, (c) non-throttled requests are permitted to proceed to completion, and (d) as non-throttled requests are completed, requests that are throttled have their speeds increased in a predetermined manner,
   wherein the number of the plurality of predictor processes is different from the number of the plurality of models.

2. The computer network of claim 1, wherein the requests are file transfer requests.

3. The computer network of claim 1, wherein the speed limiter modules are components of their respective associated servers.

4. The computer network of claim 1, wherein the predetermined manner in which requests that are throttled have their speeds increased includes restoring processing speeds for those requests, one-by-one.

5. The computer network of claim 1, wherein the initial resource threshold includes a memory threshold.

6. The computer network of claim 1, wherein an amount of throttling for requests that are throttled is further based on 1) current runtime status information pertaining to the computer network and the server associated therewith, and 2) output from the plurality of different predictor processes.

7. The computer network of claim 1, wherein the amount of throttling is based on rules applied to output from at least one of the plurality of different predictor processes.

8. A computer network, comprising:
   one or more monitors;
   a non-transitory storage medium configured to store a plurality of machine learned models, the plurality of models including a first model and a second model, the first model being based on prior, time dependent, usage of the computer network in connection with serving transfer requests, the second model being based on data of transferrable files that are servable in response to transfer requests; and
   a file transfer server including at least one processor, a memory, and a transceiver, wherein the file transfer server is configured to receive, via the transceiver and from at least one client computing device remote therefrom, a plurality of file transfer related requests to be processed by the file transfer server;
   a speed limiter module configured to at least:
      receive, from the one or more monitors, current runtime status information pertaining to the computer network and the file transfer server;
      execute, for each one of the plurality of received requests, a plurality of different predictor processes by using at least the first and second models of the plurality of models, each predictor process generating, for each one of the plurality of requests, a corresponding prediction for how a given request will impact a) the file transfer server, and/or b) the computer network, wherein at least a first one of the predictor processes is executed by using the current runtime status information and at least a second one of the plurality of different predictor processes is executed based on data associated with a corresponding one of the plurality of received requests;

determine, based on the plurality of corresponding predictions from the plurality of predictor processes, whether an incoming request is to be accepted by the file transfer server;

responsive to a determination that an incoming request is to be accepted, initiate processing of the incoming request via the file transfer server;

determine, based on the plurality of corresponding predictions from the plurality of predictor processes, whether the total resource usage of the file transfer server exceeds or is likely to exceed an initial resource threshold; and responsive to a determination that the total resource usage of the file transfer server exceeds or is likely to exceed the initial resource threshold:
cease acceptance of further incoming requests; and
control the speed at which requests currently being processed by the file transfer server are being handled, such that (a) speeds of all but at least one of the requests currently being processed are throttled, (b) requests that are being throttled are neither terminated nor timeout, (c) non-throttled requests are permitted to proceed to completion, and (d) as non-throttled requests are completed, requests that are throttled have their speeds increased in a predetermined manner, wherein the number of the plurality of predictor processes is different from the number of the plurality of models.

9. The computer network of claim 8, wherein the predetermined manner in which requests that are throttled have their speeds increased includes restoring processing speeds for those requests, one-by-one.

10. The computer network of claim 8, wherein the initial resource threshold includes a memory threshold.

11. The computer network of claim 8, wherein predictions are made in accordance with a plurality of machine-learned models.

12. The computer network of claim 11, wherein the amount of throttling is based on current network status and output from the machine-learned models.

13. The computer network of claim 8, wherein the speed limiter is further configured to at least:
determine whether the total resource usage of the file transfer server exceeds or is likely to exceed a second resource threshold, wherein the second resource threshold is greater than the initial resource threshold; and
responsive to a determination that the total resource usage of the file transfer server exceeds or is likely to exceed the final resource threshold:
process only one request at a time;
suspend requests that are not being processed and move data associated therewith to a non-transitory computer storage medium; and
as processes are completed, resume suspended requests, one at a time, for processing.

14. A file transfer server in a computer network, comprising:
at least one processor;
a memory configured to store a plurality of machine learned models, the plurality of models including a first model and a second model, the first model being based on prior, time dependent, usage of the computer network in connection with serving transfer requests, the second model being based on data of transferrable files that are servable in response to transfer requests;
a transceiver, wherein the transceiver is configured to receive, from at least one client computing device, a plurality of file transfer related requests to be processed by the file transfer server; and
a speed limiter module configured to at least:
receive, from one or more monitors, current runtime status information pertaining to the computer network and the file transfer server;
execute, for each one of the plurality of file transfer related requests, a plurality of different predictor processes by using at least the first and second models of the plurality of models, each predictor process generating, for each request, a corresponding prediction for how a given request will impact a) the file transfer server, and/or b) the computer network, wherein at least a first one of the predictor processes is executed by using the current runtime status information and at least a second one of the plurality of different predictor processes is executed based on data associated with a corresponding one of the requests;
determine, based on the plurality of corresponding predictions from the plurality of predictor processes, whether an incoming request is to be accepted by the file transfer server;
responsive to a determination that an incoming request is to be accepted, initiate processing of the incoming request via the file transfer server;
determine, based on the plurality of corresponding predictions from the plurality of predictor processes, whether the total resource usage of the file transfer server exceeds or is likely to exceed an initial resource threshold; and
responsive to a determination that the total resource usage of the file transfer server exceeds or is likely to exceed the initial resource threshold:
cease acceptance of further incoming requests; and
control the speed at which requests currently being processed by the file transfer server are being handled, such that (a) speeds of all but at least one of the requests currently being processed are throttled, (b) all of the connections for the requests that are being throttled are maintained without terminating or timing out, (c) non-throttled requests are permitted to proceed to completion, and (d) as non-throttled requests are completed, requests that are throttled have their speeds increased in a predetermined manner,
wherein the number of the plurality of predictor processes is different from the number of the plurality of models.

15. A computer-implemented method of handling requests received by a cluster comprising a plurality of servers from at least one client computing via a load balancer, wherein each said server has a speed limiter module associated therewith and includes at least one processor, a memory, and a transceiver, wherein the cluster and the at least one client are provided in a computer network, the method comprising, in connection with each said speed limiter and the server associated therewith:

storing, to a non-transitory storage medium, a plurality of machine learned models, the plurality of models including a first model and a second model, the first model being based on prior, time dependent, usage of the computer network in connection with serving transfer requests, the second model being based on data of transferrable files that are servable in response to transfer requests;

receiving, from one or more monitors, current runtime status information pertaining to the computer network and the respective server;

executing, for each one of a plurality of received requests, a plurality of different predictor processes by using at least the first and second models of the plurality of models, each predictor process generating, for each one of the plurality of requests, a corresponding prediction for how a given request will impact a) the server associated therewith, and/or b) the computer network, wherein at least a first one of the predictor processes is executed by using the current runtime status information and at least a second one of the plurality of different predictor processes is executed based on data associated with a corresponding one of the plurality of received requests;

determining, based on the plurality of corresponding predictions from the plurality of predictor processes, whether an incoming request is to be accepted by the server associated therewith;

responsive to a determination that an incoming request is to be accepted, initiating processing of the incoming request via the server associated therewith;

determining, based on the plurality of corresponding predictions from the plurality of predictor processes, whether the total resource usage of the server associated therewith exceeds or is likely to exceed an initial resource threshold; and responsive to a determination that the total resource usage of the server associated therewith exceeds or is likely to exceed the initial resource threshold:
  ceasing acceptance of further incoming requests; and
  controlling the speed at which requests currently being processed by the server associated therewith are being handled, such that (a) speeds of all but at least one of the requests currently being processed are throttled, (b) requests that are being throttled are neither terminated nor timeout nor handed over to another server in the cluster, (c) non-throttled requests are permitted to proceed to completion, and (d) as non-throttled requests are completed, requests that are throttled have their speeds increased in a predetermined manner, wherein the number of the plurality of predictor processes is different from the number of the plurality of models.

16. A non-transitory computer readable storage medium tangibly storing instructions for executing the method of claim 15.

17. A method of handling file transfer requests made by one or more client computing devices to a file transfer server in a computer network, the method comprising:

storing, to a non-transitory storage medium, a plurality of machine learned models, the plurality of models including a first model and a second model, the first model being based on prior, time dependent, usage of the computer network in connection with serving transfer requests, the second model being based on data of transferrable files that are servable in response to transfer requests;

receiving, from one or more monitors, current runtime status information pertaining to the computer network and the file transfer server;

executing, for each one of the file transfer requests, a plurality of different predictor processes by using at least the first and second models of the plurality of models, each predictor process generating, for each one of the file transfer requests, a corresponding prediction for how a given request will impact a) the file transfer server and/or b) the computer network, wherein at least a first one of the predictor processes is executed by using the current runtime status information and at least a second one of the plurality of different predictor processes is executed based on data associated with a corresponding one of the file transfer requests;

determining, based on the plurality of corresponding predictions from the plurality of predictor processes, whether an incoming request is to be accepted by the file transfer server;

responsive to a determination that an incoming request is to be accepted, initiating processing of the incoming request via the file transfer server;

determining, based on the plurality of corresponding predictions from the plurality of predictor processes, whether the total resource usage of the file transfer server exceeds or is likely to exceed an initial resource threshold; and responsive to a determination that the total resource usage of the file transfer server exceeds or is likely to exceed the initial resource threshold:
  ceasing acceptance of further incoming requests; and
  controlling the speed at which requests currently being processed by the file transfer server are being handled, such that (a) speeds of all but at least one of the requests currently being processed are throttled, (b) requests that are being throttled are neither terminated nor timeout, (c) non-throttled requests are permitted to proceed to completion, and (d) as non-throttled requests are completed, requests that are throttled have their speeds increased in a predetermined manner, wherein the number of the plurality of predictor processes is different from the number of the plurality of models.

18. A non-transitory computer readable storage medium tangibly storing instructions for executing the method of claim 17.

* * * * *